US011241911B2

(12) United States Patent
Gagnon

(10) Patent No.: US 11,241,911 B2
(45) Date of Patent: Feb. 8, 2022

(54) WHEEL END ASSEMBLY AND SPINDLE CONFIGURED THEREFOR

(71) Applicant: Gagnon Family Trust, Cold Spring Harbor, NY (US)

(72) Inventor: Philippe Gagnon, Huntington, NY (US)

(73) Assignee: Gagnon Family Trust, Cold Spring Harbor, NY (US)

( * ) Notice: Subject to any disclaimer, the term of this patent is extended or adjusted under 35 U.S.C. 154(b) by 443 days.

(21) Appl. No.: 16/323,164

(22) PCT Filed: Jun. 9, 2017

(86) PCT No.: PCT/US2017/036757
§ 371 (c)(1),
(2) Date: Feb. 4, 2019

(87) PCT Pub. No.: WO2017/214506
PCT Pub. Date: Dec. 14, 2017

(65) Prior Publication Data
US 2019/0299711 A1     Oct. 3, 2019

Related U.S. Application Data

(60) Provisional application No. 62/347,858, filed on Jun. 9, 2016, provisional application No. 62/355,585, filed on Jun. 28, 2016.

(51) Int. Cl.
  *B60B 35/02*    (2006.01)
  *B60B 27/00*    (2006.01)
  (Continued)

(52) U.S. Cl.
  CPC ........ *B60B 35/025* (2013.01); *B60B 27/0047* (2013.01); *B60B 35/001* (2013.01);
  (Continued)

(58) Field of Classification Search
  CPC ..... B60B 35/025; B60B 35/001; B60B 35/04; B60B 35/08; B60B 35/02; B60B 27/0047; B60B 2310/302; B60B 2320/10
  See application file for complete search history.

(56) References Cited

U.S. PATENT DOCUMENTS

| 549,552 | A | * | 11/1895 | Vraalstad | ................ B60B 35/04 |
| | | | | | 301/129 |
| 757,444 | A | * | 4/1904 | Entrekin | ................ B60B 35/02 |
| | | | | | 301/132 |

(Continued)

FOREIGN PATENT DOCUMENTS

| CN | 101743134 A | 6/2010 |
| CN | 102756613 A | 10/2012 |

(Continued)

OTHER PUBLICATIONS

PCT International Search Report and Written Opinion for PCT/US2017/036757 dated Oct. 16, 2017, 23 pages.

(Continued)

*Primary Examiner* — Jason R Bellinger
*Assistant Examiner* — Emily G Castonguay
(74) *Attorney, Agent, or Firm* — Carter, DeLuca & Farrell LLP; George Likourezos

(57) ABSTRACT

A spindle for a wheel end assembly includes a first end of the spindle receiving the wheel of a vehicle on a first side of the wheel end assembly, and a second end of the spindle defining a flange and receiving the axle of a vehicle is disclosed. The flange includes a socket joint that receives the axle on the second side of the wheel end assembly. Mounting members extend distally from the second side a first distance to secure the spindle to the wheel end assembly via the flange. The socket joint of the spindle extends from the second side of the wheel end assembly a second distance from the second side. The second distance is greater than the (Continued)

first distance. A third distance represents degree of overlap of the axle by a ratio with respect to the outer diameter of the axle ranging from 8% to 20%.

16 Claims, 25 Drawing Sheets

(51) Int. Cl.
    *B60B 35/00*     (2006.01)
    *B60B 35/04*     (2006.01)
    *B60B 35/08*     (2006.01)

(52) U.S. Cl.
    CPC .............. *B60B 35/04* (2013.01); *B60B 35/08* (2013.01); *B60B 2310/302* (2013.01); *B60B 2320/10* (2013.01)

(56) References Cited

U.S. PATENT DOCUMENTS

| | | | |
|---|---|---|---|
| 4,048,466 A | 9/1977 | Toth et al. | |
| 4,135,766 A * | 1/1979 | Trautloff | B60B 35/14 301/114 |
| 5,226,691 A * | 7/1993 | Kane | B60B 35/02 301/130 |
| 6,086,162 A * | 7/2000 | Pinch | B60G 3/145 228/185 |
| 6,299,259 B1 | 10/2001 | MacKarvich | |
| 7,717,526 B2 * | 5/2010 | Chalin | B60B 35/04 301/132 |
| 9,533,531 B2 * | 1/2017 | Dziekonski | B60B 35/14 |

FOREIGN PATENT DOCUMENTS

| | | |
|---|---|---|
| EP | 2878456 A1 | 6/2015 |
| WO | 2016044221 A1 | 3/2016 |

OTHER PUBLICATIONS

Chinese Office Action dated Sep. 28, 2021, issued in corresponding Chinese Application No. 2017800355636, 15 pages.
Tie Down Engineering Part No. 200330V09, six (6) pages, Published 2013, Provided to Tie Down Engineering Customers.†
IMT Drawing No. 502427; three (3) pages; Published 2013; Provided to Ingersoll Axle Customers.†
Tie Down Engineering Part 200070TV9; six (6) pages; Published 2013; Provided to Tie Down Engineering Customers.†

\* cited by examiner
† cited by third party

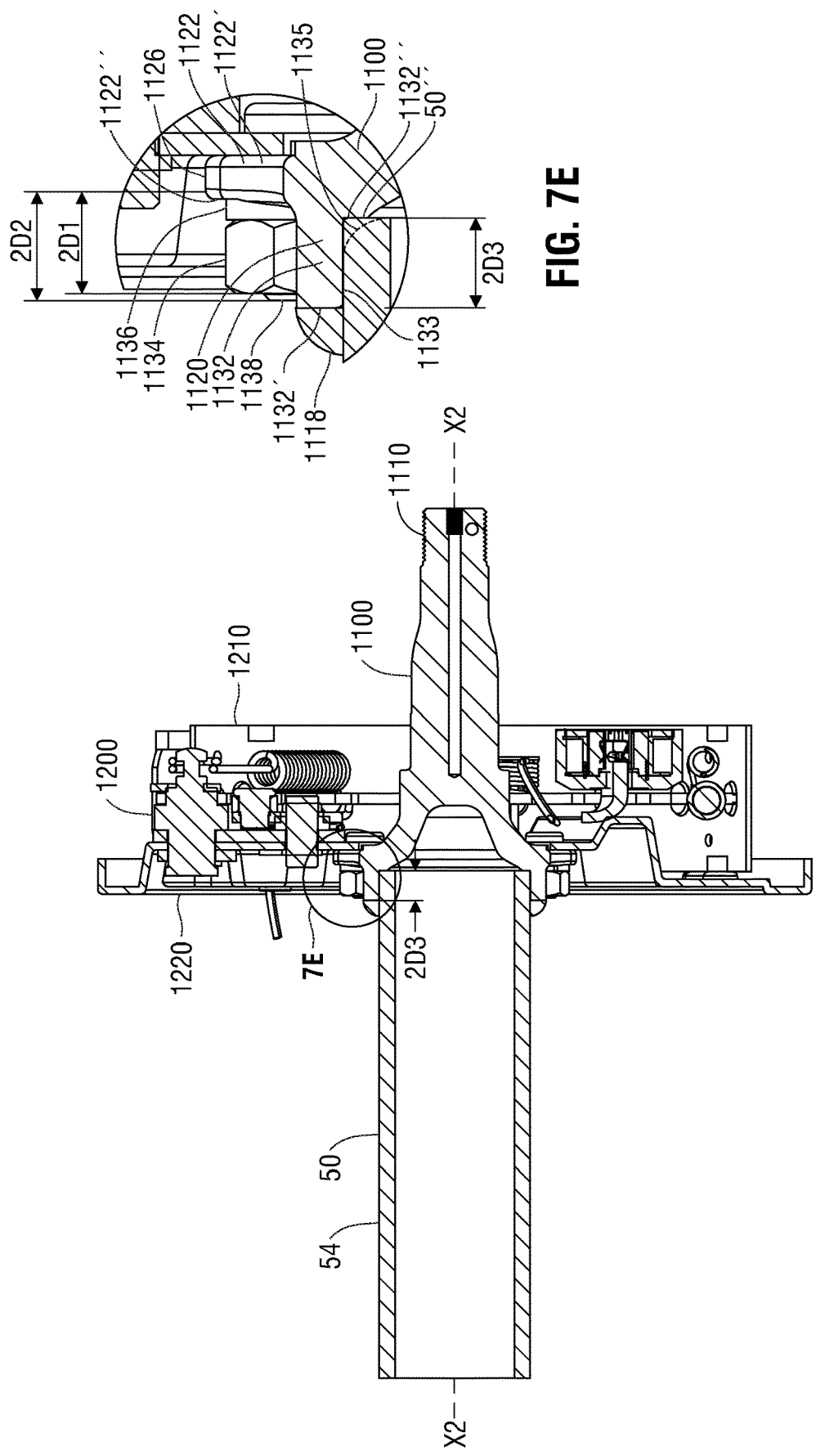

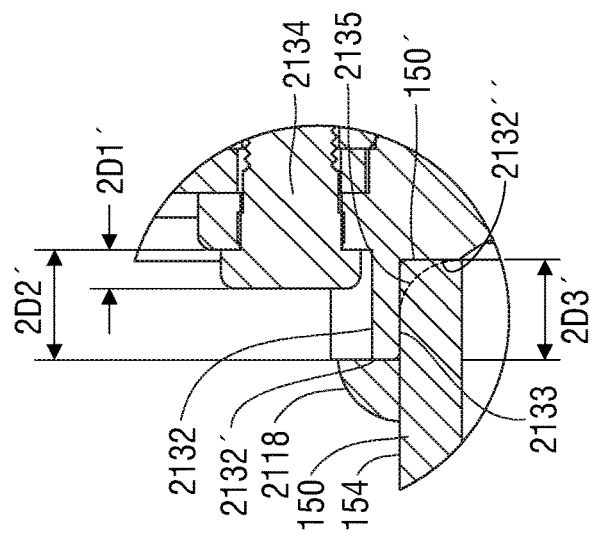
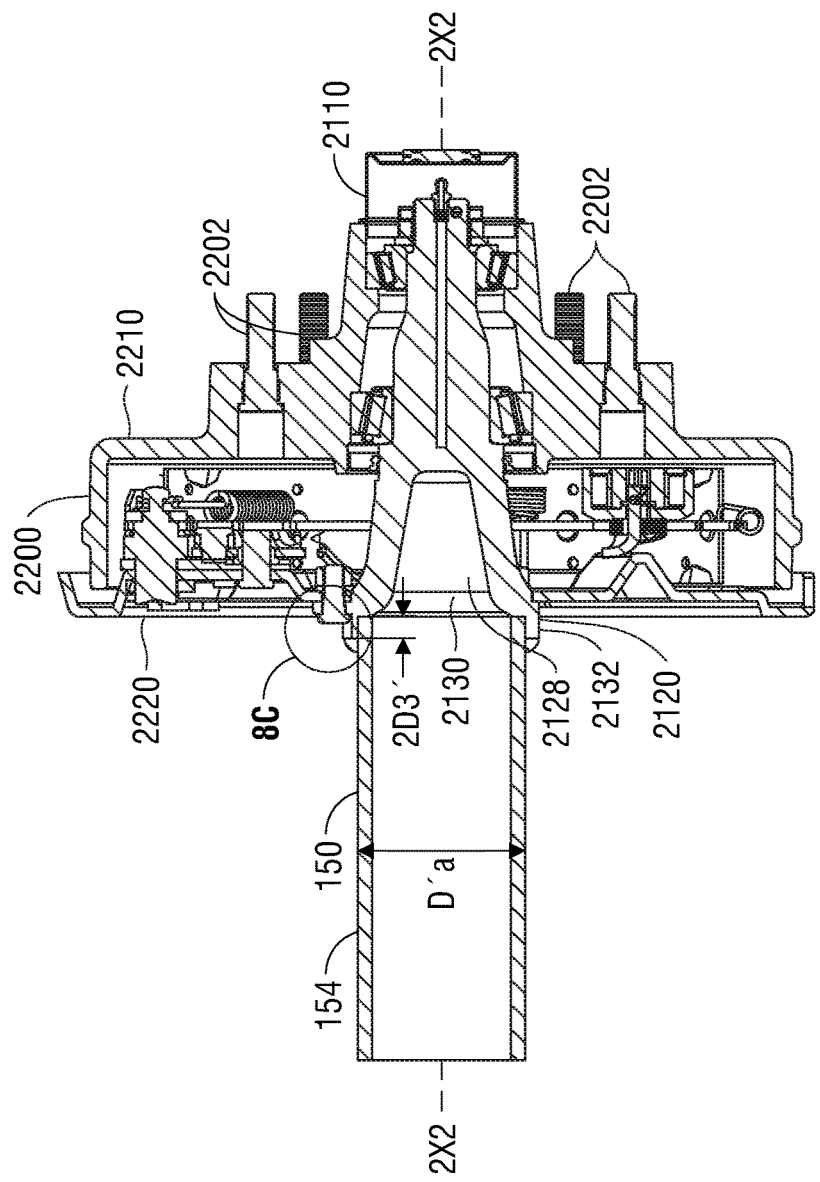
FIG. 8C
FIG. 8B

WHEEL END ASSEMBLY AND SPINDLE CONFIGURED THEREFOR

CROSS-REFERENCE TO RELATED APPLICATIONS

This application claims priority to and benefit of U.S. provisional patent application 62/347,858 filed on Jun. 9, 2016 and U.S. provisional patent application 62/355,585 filed on Jun. 28, 2016, both by Philippe Gagnon and entitled "WHEEL END ASSEMBLY AND SPINDLE CONFIGURED THEREFOR", the entire contents of both applications are incorporated herein by reference.

BACKGROUND

1. Technical Field

The present disclosure relates to axle components generally for non-drivable and non-steerable axles for personal and commercial vehicular trailers and more particularly to spindles which are component on vehicular axles for such non-drivable and non-steerable "tag" axles for personal and commercial trailers.

2. Description of Related Art

The spindle is a component on vehicular axles, mainly on non-drivable and non-steerable "tag" axles for personal and commercial trailers. Trailers are towed behind personal vehicles or commercial trucks. Such trailers include, for example, automobile haulers, bottom or side dump trailers, bulk commodity trailers, concession trailers, dry freight haulers, dump body trailers or transfer boxes, flatbed trailers, gooseneck trailers, horse trailers, livestock trailers, logging trailers, low-boy trailers, pole trailers, refrigerated dry freight haulers, tank trailers, tilt trailers, travel trailers and utility haulers.

The spindle is a major component of the axle which is welded on a tube and on which the brake, seals, bearings, hubs, wheel and tires are mounted. The spindle rotational axis is the rotational axis of the tire. There are several factors that are of particular focus for the design of such axle components, which include at least the following:

Concentricity between the spindle and the tube, and consequently from spindle to spindle, is desired to eliminate/minimize vibration during motion.

Perpendicularity between the spindle and the tube is desired to eliminate/minimize premature tire wear and/or failure.

Bending is the primary form of loading on a tag axle. The vertical reaction force on the tires from the weight of the trailer and from "bump" forces create a bending moment between the hub face and the spring seat. Side forces from turning also create bending moments.

There are several methods known in the art for connecting the spindle to the axle and the wheel end assembly of the vehicles. These include the following:

Butt Welding Method
Loose Fit Extension Welded Method
Flat Back Welding Method

In the butt welding method, the spindle and tube need elaborate alignment jigs to assure concentricity and perpendicularity. The weld may be easily misaligned and requires a sophisticated testing method to ensure that it is located correctly. The bending stresses are imposed on the weld, which is generally a butt weld.

In the loose fit extension welded method, the fit is loose as the dimensional tolerance on the inside diameter of the tube is relatively large and allowance is required for the weld flash inside the tube. Elaborate jigging is required to assure concentricity and perpendicularity. The extension adds to the cost of the spindle. The weld is generally a fillet weld.

In the flat back welding method, the spindle and tube require elaborate alignment jigs to assure concentricity and perpendicularity. The bending stresses are also imposed on the weld, which is generally a fillet weld.

SUMMARY

The embodiments of the present disclosure provide significant and unobvious advantages over the foregoing disadvantages of the prior art by providing a spindle with an internal tube pilot journal.

The fit between the tube and the spindle assures concentricity and perpendicularity without elaborate and expensive jigging. The embodiments of the present disclosure enable "self-jigging". The fit accommodates a portion of the bending stresses, thereby relieving stress from the weld and enables a larger internal cavity inside the spindle for lower weight and lower cost.

In view of the foregoing, the present disclosure relates to a spindle for a wheel end assembly that includes for a wheel end assembly configured to define a first side to receive a wheel of a vehicle and a second side configured to receive an axle of a vehicle, a spindle extending longitudinally to define a longitudinal axis from a first end of the spindle to a second end of the spindle. The first end of the spindle is configured to receive the wheel of a vehicle on the first side of the wheel end assembly. The second end of the spindle is configured to receive the axle of a vehicle on the second side of the wheel end assembly. The axle of a vehicle defines a longitudinal axis extending from the second side of the wheel end assembly. The second end of the spindle defines a flange configured to enable a plurality of mounting members to be received therethrough and defines a socket joint configured to receive the axle of the vehicle on the second side of the wheel end assembly. The mounting members are configured to extend distally from the second side of the wheel end assembly and along the longitudinal axis of the axle of a vehicle to define a first distance from the second side of the wheel end assembly. The mounting members are configured to secure the spindle to the wheel end assembly via the flange. The socket joint of the spindle extends from the second side of the wheel end assembly and along a longitudinal axis of the axle of a vehicle to define a second distance from the second side of the wheel assembly, wherein the second distance is greater than the first distance.

In embodiments, the second distance is greater than the first distance to enable the spindle to be welded to the axle of a vehicle when the mounting members have been received through the flange of the spindle to secure the spindle to the wheel assembly.

In embodiments, the socket joint of the spindle defines a central aperture extending at least to an internal surface of the socket joint and wherein the axle of a vehicle defines an end extending into the central aperture at least to the internal surface of the socket joint to define a third distance establishing degree of overlap of the socket joint over the axle.

In embodiments, the axle of a vehicle defines an outer diameter and wherein the third distance establishing degree of overlap defines a ratio with respect to the outer diameter that ranges from 8% to 20%.

The present disclosure relates also to a combination spindle and wheel end assembly that includes a wheel end assembly configured to define a first side to receive a wheel of a vehicle and a second side configured to receive an axle of a vehicle, and a spindle extending longitudinally to define a longitudinal axis from a first end of the spindle to a second end of the spindle. The first end of the spindle is configured to receive the wheel of a vehicle on the first side of the wheel end assembly. The second end of the spindle is configured to receive the axle of a vehicle on the second side of the wheel end assembly. The axle of a vehicle defines a longitudinal axis extending from the second side of the wheel end assembly. The second end of the spindle defines a flange configured to enable a plurality of mounting members to be received therethrough and defines a socket joint configured to receive the axle of the vehicle on the second side of the wheel end assembly. The mounting members are configured to extend distally from the second side of the wheel end assembly and along the longitudinal axis of the axle of a vehicle to define a first distance from the second side of the wheel end assembly. The mounting members are configured to secure the spindle to the wheel end assembly via the flange. The socket joint of the spindle extends from the second side of the wheel end assembly and along a longitudinal axis of the axle of a vehicle to define a second distance from the second side of the wheel assembly, wherein the second distance is greater than the first distance.

In embodiments, the second distance is greater than the first distance to enable the spindle to be welded to the axle of a vehicle when the mounting members have been received through the flange of the spindle to secure the spindle to the wheel assembly.

In embodiments, the socket joint of the spindle defines a central aperture extending at least to an internal surface of the socket joint and wherein the axle of a vehicle defines an end extending into the central aperture at least to the internal surface of the socket joint to define a third distance establishing degree of overlap of the socket joint over the axle.

In embodiments, the axle of a vehicle defines an outer diameter and wherein the third distance establishing degree of overlap defines a ratio with respect to the outer diameter that ranges from 8% to 20%.

The present disclosure relates also to spindle for a wheel end assembly that includes, for a wheel end assembly configured to define a first side to receive a wheel of a vehicle and a second side configured to receive an axle of a vehicle, a spindle extending longitudinally to define a longitudinal axis from a first end of the spindle to a second end of the spindle. The first end of the spindle is configured to receive the wheel of a vehicle on the first side of the wheel end assembly. The second end of the spindle defines a flange integrated with a load-supporting member. The flange is integrated with the load-supporting member further includes a load-supporting drop arm extension member that projects downwardly from the load-supporting member to define a socket joint that includes a central aperture that is configured and disposed to receive an axle of a vehicle therein. The spindle and load-supporting member and load-supporting drop arm extension member define thereby a spindle and drop arm integrated with a brake flange assembly.

In embodiments, the axle of a vehicle defines an external surface and an end, and the load-supporting drop arm extension member forms a bulk cylindrical section of the socket joint to concentrically define the central aperture, the bulk cylindrical section overlapping the external surface of the axle when the end is received within the socket joint.

In embodiments, the bulk cylindrical section of the socket joint defines a centerline axis that coincides with a longitudinal axis of the axle of a vehicle to define a first distance by which the bulk cylindrical section overlaps the external surface of the axle when the end is received within the socket joint to enable a fillet weld to be formed between the bulk cylindrical section and the external surface of the axle.

In embodiments, the end extends into the central aperture of the socket joint to define a distance establishing the degree of overlap of the socket joint over the axle.

In embodiments, the axle defines an outer diameter and the distance establishing the degree of overlap of the socket joint over the axle defines a ratio with respect to the outer diameter of the axle that ranges from 8% to 20%.

In embodiments, the load-supporting drop arm extension member extends downwardly and outwardly away from the axle side of the wheel end assembly to form an angle such that an internal surface of the bulk cylindrical section defines a second distance by which the internal surface extends away from the axle side of the wheel end assembly.

The present disclosure relates also to a method of assembling a spindle for a wheel end assembly that includes providing a wheel end assembly configured to define a first side to receive a wheel of a vehicle and a second side configured to receive an axle of a vehicle; providing a spindle extending longitudinally to define a longitudinal axis from a first end of the spindle to a second end of the spindle, the first end of the spindle configured to receive the wheel of a vehicle on the first side of the wheel end assembly, the second end of the spindle configured to receive the axle of a vehicle on the second side of the wheel end assembly, the axle of a vehicle defining a longitudinal axis extending from the second side of the wheel end assembly; and configuring the second end of the spindle to define a flange configured to enable a plurality of mounting members to be received therethrough and defining a socket joint configured to receive the axle of the vehicle on the second side of the wheel end assembly. The mounting members are configured to extend distally from the second side of the wheel end assembly and along the longitudinal axis of the axle of a vehicle to define a first distance from the second side of the wheel end assembly. The mounting members are configured to secure the spindle to the wheel end assembly via the flange. The socket joint of the spindle extends from the second side of the wheel end assembly and along a longitudinal axis of the axle of a vehicle to define a second distance from the second side of the wheel assembly, wherein the second distance is greater than the first distance.

In embodiments, the method further includes mounting the spindle to the second side of the wheel end assembly via inserting the mounting members into the flange of the spindle.

In embodiments, the method further includes machining a journal inside a central aperture of the socket joint to create a pilot surface for the axle.

In embodiments, the method further includes inserting an axle of a vehicle into the central aperture of the socket joint to interface with the pilot surface of the socket joint to form a corner for a fillet weld between a surface of the socket joint and an external surface of the axle of the vehicle.

In embodiments, the method further includes wherein the external surface of the axle defines an outer diameter and the inserting an axle of a vehicle into the central aperture of the socket joint to interface with the pilot surface of the socket joint to form a corner for a fillet weld between a surface of the socket joint and an external surface of the axle of the vehicle includes inserting the axle of a vehicle into the central aperture a distance defining a ratio between the distance the axle of a vehicle has been inserted into the central aperture and the outer diameter defined by the external that ranges from 8% to 20%.

In embodiments, the method further includes welding the surface of the socket joint to the external surface of the axle of the vehicle to form a fillet weld while the spindle is mounted to the wheel end assembly.

The present disclosure relates also to a method of manufacturing a spindle for a wheel end assembly that includes providing a spindle extending longitudinally to define a longitudinal axis from a first end of the spindle to a second end of the spindle, configuring the first end of the spindle to receive a wheel of a vehicle on a first side of a wheel end assembly that is configured to receive the wheel of a vehicle on the first side of the wheel end assembly and is configured to receive an axle of a vehicle on a second side of the wheel end assembly, configuring the second end of the spindle to define a flange integrated with a load-supporting member, configuring the flange integrated with the load-supporting member to further include a load-supporting drop arm extension member that projects downwardly from the load-supporting member to define a socket joint that includes a central aperture that is configured and disposed to receive the axle of a vehicle therein, such that the spindle and load-supporting member and load-supporting drop arm extension member defines thereby a spindle and drop arm integrated with a brake flange assembly.

In embodiments, the method further includes, wherein the axle of a vehicle defines an external surface and an end, configuring the load-supporting drop arm extension member to form a bulk cylindrical section of the socket joint to concentrically define the central aperture, such that the bulk cylindrical section overlaps the external surface of the axle when the end is received within the socket joint.

In embodiments, the method further includes configuring the bulk cylindrical section of the socket joint to define a centerline axis that coincides with a longitudinal axis of the axle of a vehicle to define a distance by which the bulk cylindrical section overlaps the external surface of the axle when the end is received within the socket joint to enable a fillet weld to be formed between the bulk cylindrical section and the external surface of the axis or tube.

In embodiments, the method further includes, wherein the external surface of the axle defines an outer diameter, wherein configuring the end to extend into the central aperture of the socket joint to define a distance establishing the degree of overlap of the socket joint over the axle includes configuring the end to extend into the central aperture such that the distance by which the bulk cylindrical section overlaps the external surface of the axle defines a ratio with respect to the outer diameter of the axle that ranges from 8% to 20%.

In embodiments, the method further includes configuring the load-supporting drop arm extension member to extend downwardly and outwardly away from the axle side of the wheel end assembly to form an angle such that an internal surface of the bulk cylindrical section defines a second distance by which the internal surface extends away from the axle side of the wheel end assembly.

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 7D is a cross-sectional elevation or side view of the axle and spindle assembly of FIGS. 6-6C mounted with the wheel end assembly to form the wheel end and spindle assembly and illustrating the dimensions that enable implementation of the extended spindle socket-hub method according to embodiments of the present disclosure;

FIG. 7E is an enlarged view of detail 7E in FIG. 7D illustrating certain dimensions;

FIG. 8B is a cross-sectional elevation or side view of the axle and spindle assembly of FIGS. 8-8A mounted with the wheel end assembly to form the wheel end and spindle assembly and illustrating the dimensions that enable implementation of the extended spindle socket-hub method according to embodiments of the present disclosure;

FIG. 8C is an enlarged view of detail 8C in FIG. 8B illustrating certain dimensions;

DETAILED DESCRIPTION

Figure 1:
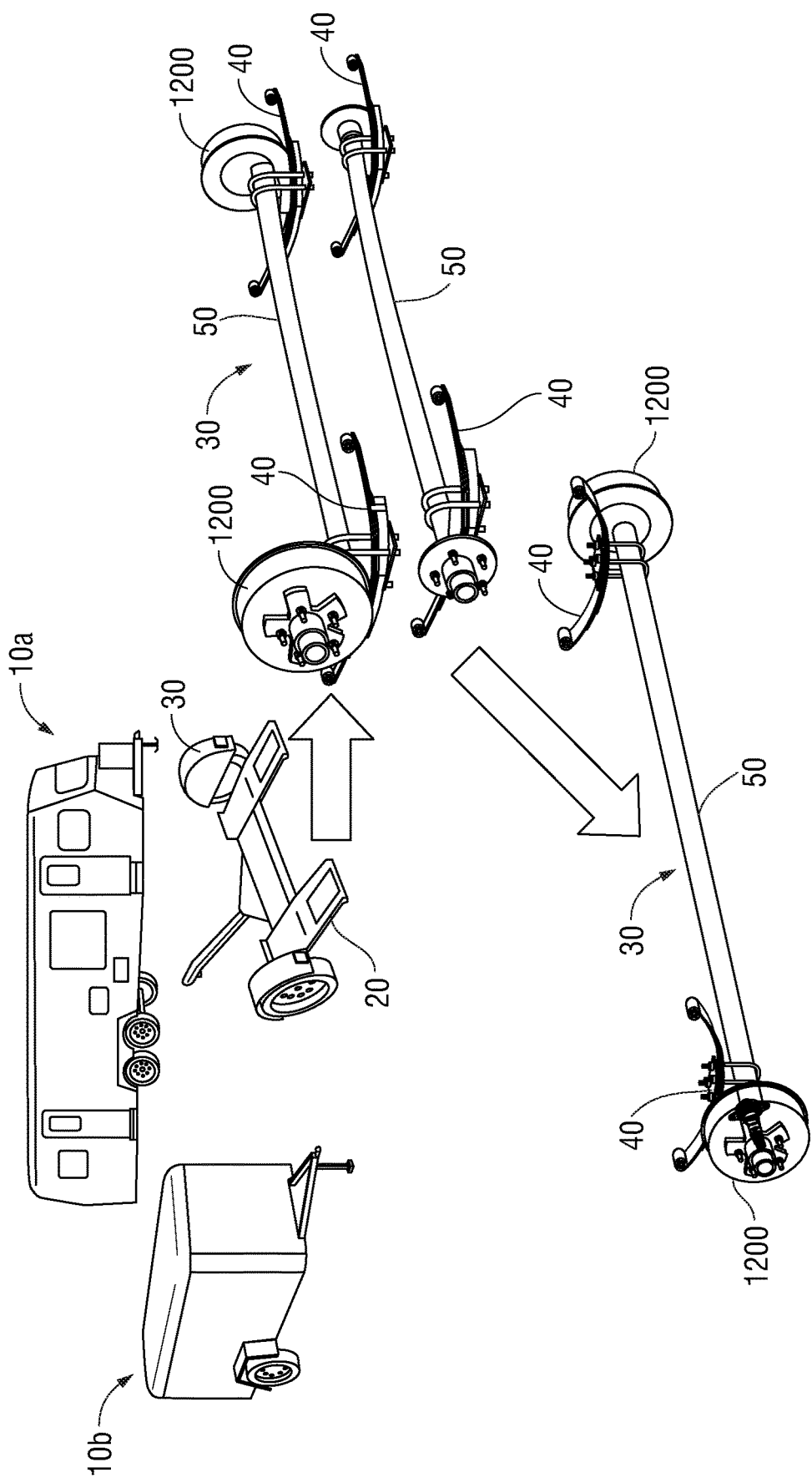
FIG. 1 illustrates examples of personal and commercial vehicular trailers having non-drivable and non-steerable axles wherein the wheel end assemblies and spindles configured for such wheel end assemblies according to embodiments of the present disclosure may be applied.

As indicated above, the embodiments of the present disclosure provide significant and unobvious advantages over the foregoing disadvantages of the prior art by providing a spindle with an internal tube pilot journal and extended spindle socket hub as part of an extended spindle socket hub method of connecting an axle or tube of a vehicle to a wheel end assembly. As defined herein, reference to an axle of a vehicle also includes a tube of a vehicle as being equivalent to an axle of a vehicle and the terms may be used interchangeably.

The fit between the tube and the spindle assures concentricity and perpendicularity without elaborate and expensive jigging. The embodiments of the present disclosure enable "self-jigging". The fit accommodates a portion of the bending stresses, thereby relieving stress from the weld and enables a larger internal cavity inside the spindle for lower weight and lower cost.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" may be used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

FIG. 1 illustrates examples of personal and commercial vehicular trailers having non-drivable and non-steerable axles wherein the wheel end assemblies and spindles configured for such wheel end assemblies according to embodiments of the present disclosure may be applied. More particularly, FIG. 1 illustrates a recreational vehicle trailer 10a and an enclosed utility trailer 10b that are examples of vehicles wherein the extended spindle socket hub method of connecting an axle to a wheel end assembly according to embodiments of the present disclosure may be utilized. Other examples of such vehicles include, but are not limited to, automobile haulers, bottom or side dump trailers, bulk commodity trailers, concession trailers, dry freight trailers, dump body trailers or transfer boxes, flatbed trailers, gooseneck trailers, horse trailers, livestock trailers, lodging trailers, low-boy trailers, pole trailers, refrigerated dry freight trailers, tank trailers, tilt trailers, travel trailers and utility trailers. Such vehicles generally include a support frame 20, e.g., a car dollie, mounted on an axle and leaf spring wheel end assembly 30 that includes leaf springs 40 mounted either below or above axle 50 wherein the axle 50 is connected to a wheel end assembly 1200. According to embodiments of the present disclosure, the wheel end assembly 1200 includes a spindle with an extended socket hub which is described further below with reference to the various figures, such as FIGS. 5A-8D.

Figure 2:
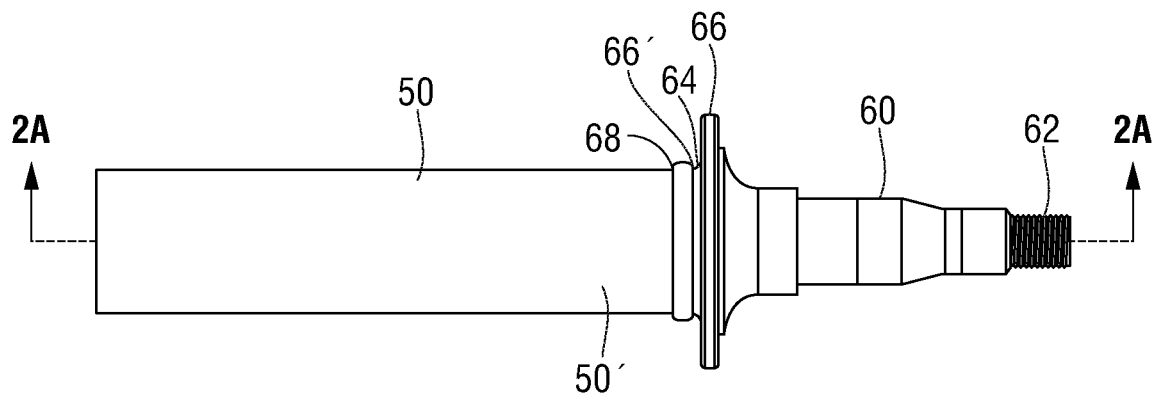
FIG. 2 is a view of an axle and spindle assembly configured according to the butt welding method of the prior art.
Figure 2A:
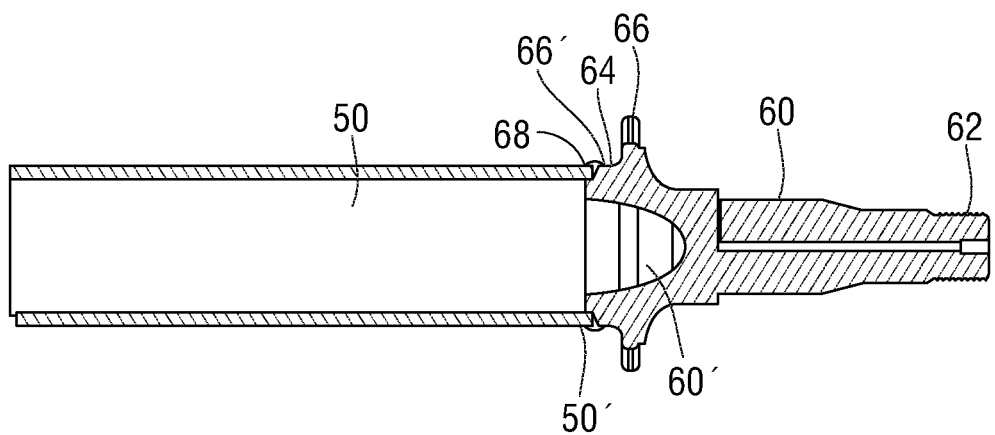
FIG. 2A is a cross-sectional view of the axle and spindle assembly of FIG. 2 taken along section-line 2A-2A.

To illustrate the non-obvious advantages of the extended spindle socket hub method of connecting an axle to a wheel end assembly, FIGS. 2 and 2A illustrate views of an axle and spindle assembly configured according to the butt welding method of the prior art. In the butt welding method, axle 50 which is in the form of a hollow tube is connected to a spindle 60 that is configured to be connected to the axle 50 via the butt welding method. The spindle 60 includes a first or wheel end 62 and a second or axle end 64. A flange member 66 is positioned at the second or axle end 64. One end 50' of the axle or tube 50 is positioned flush with a tubular projection 66' extending longitudinally from the flange member 66. The end 50' is then welded to the tubular projection 66' of the spindle 60 to form a butt weld 68.

Figure 2B:
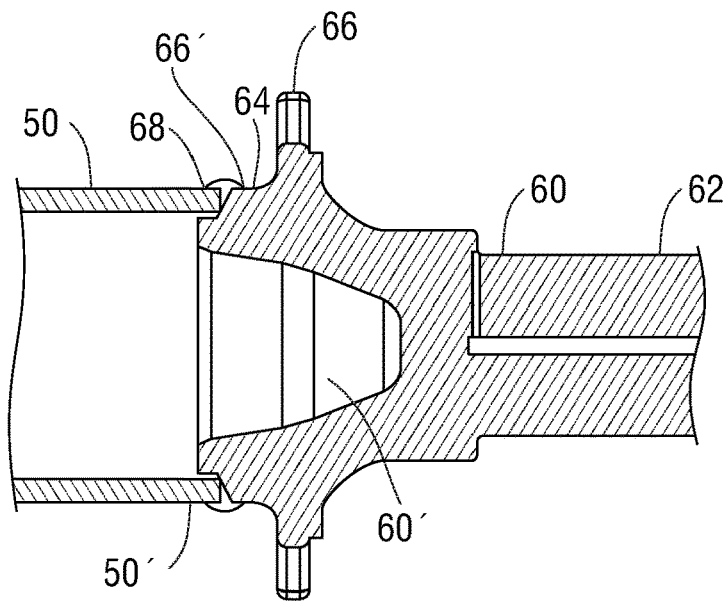
FIG. 2B is a view of Detail 2B as identified in FIG. 2A.
Figure 2C:
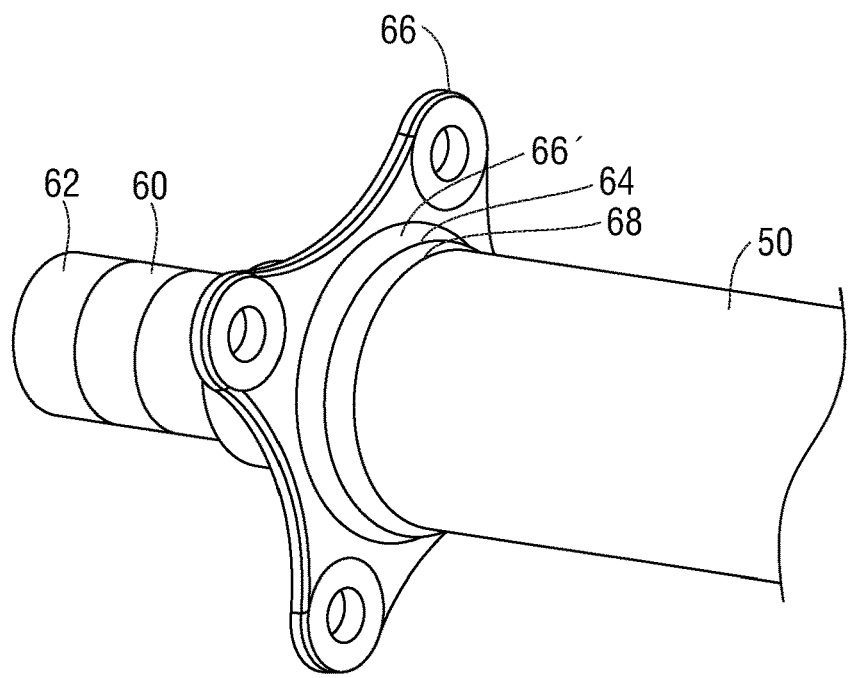
FIG. 2C is a perspective view of the axle and spindle assembly configured according to the butt welding method of FIG. 2.

FIGS. 2B and 2C provide additional views of the butt weld 68 and the connection between the spindle 60 and the axle or tube 50. FIGS. 2A and 2B illustrate the internal volume 60' formed within the spindle 60 that extends from second or axle end 64 partially towards the first or wheel end 62 of the spindle.

In the butt welding method, elaborate alignment jigs (not shown) are required to assure concentricity and perpendicularity of the spindle 60 and axle or tube 50. The butt weld 68 may be easily misaligned and requires a sophisticated testing method to ensure that it is located correctly. The bending stresses either due to the additional trailer weight loads and/or vehicle motion are imposed on the weld.

Figure 3:
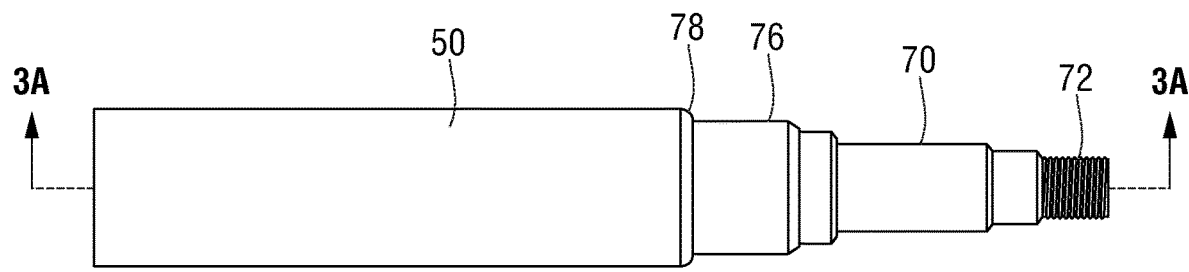
FIG. 3 is a view of an axle and spindle assembly configured according to the loose fit extension method of the prior art.
Figure 3A:
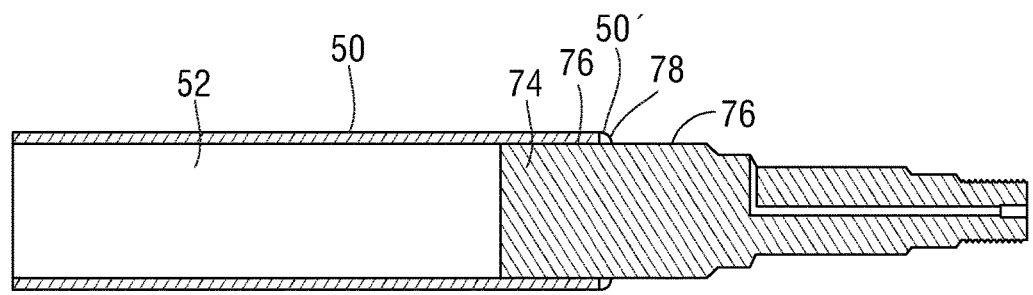
FIG. 3A is a cross-sectional view of the axle and spindle assembly of FIG. 3 taken along section-line 3A-3A.
Figure 3B:
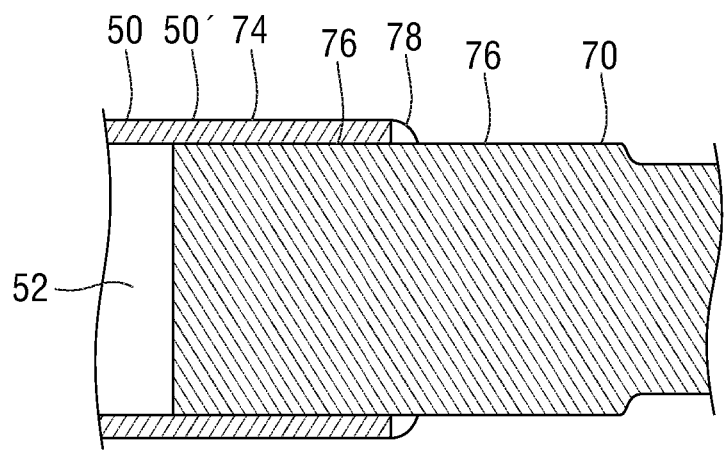
FIG. 3B is a view of Detail 3B as identified in FIG. 3A.
Figure 3C:
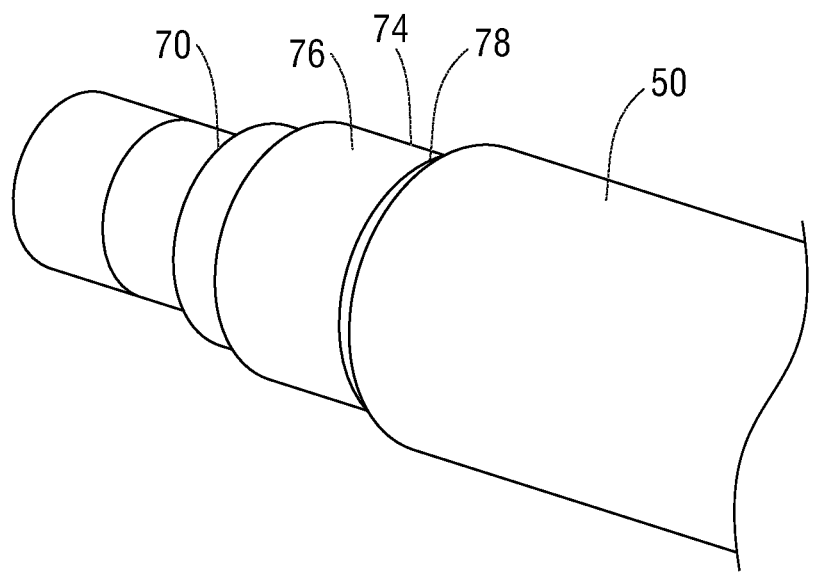
FIG. 3C is a perspective view of the axle and spindle assembly configured according to the loose fit extension method of FIG. 3.

FIGS. 3 and 3A illustrate views of an axle and spindle assembly configured according to the loose fit extension method of the prior art. In the loose fit extension method, axle 50 which is again in the form of a hollow tube is connected to a spindle 70 that is configured to be connected to the axle 50 via the loose fit extension method. In contrast to spindle 60 described above with respect to the butt welding method, while spindle 70 does include a first or wheel end 72 and a second or axle end 74, spindle 70 does not include a flange such as flange 66 but rather a cylindrical outer surface 76 that extends into internal volume 52 defined by the axle or tube 50 such that one end 50' of the axle or tube 50 concentrically overlaps the cylindrical outer surface 76. Therefore, the wheel end assembly (not shown) is only secured to the spindle on the first or wheel end 72 while the spindle 70 is secured to the cylindrical outer surface at the end 50' via a fillet weld 78, hence the term "loose fit extension" method.

Thus, in the loose fit extension welded method, the fit is loose as the dimensional tolerance on the inside diameter of the tube 50 is relatively large and allowance is required for the weld flash inside the tube. Elaborate jigging is required to assure concentricity and perpendicularity. The extension adds to the cost of the spindle 70. As indicated above, the weld 78 is generally a fillet weld.

Figure 4:
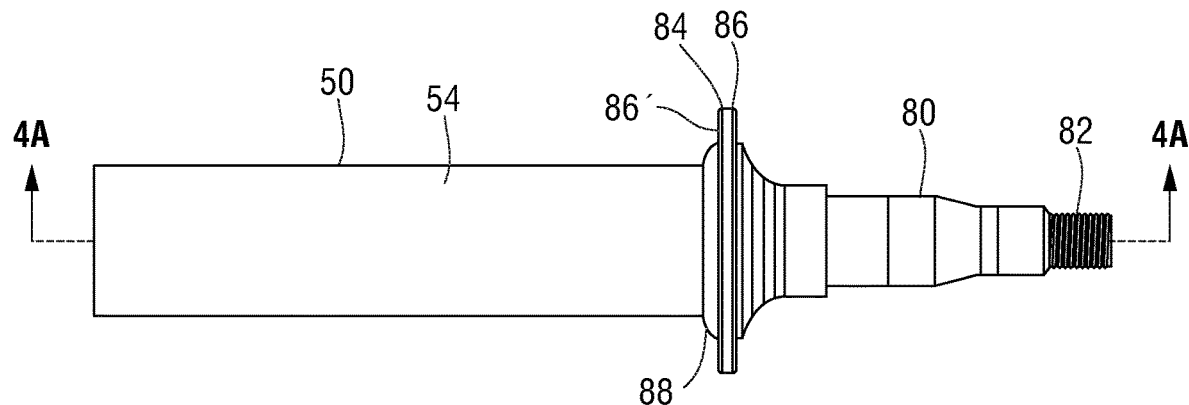
FIG. 4 is a view of an axle and spindle assembly configured according to the flat back welding method of the prior art.
Figure 4A:
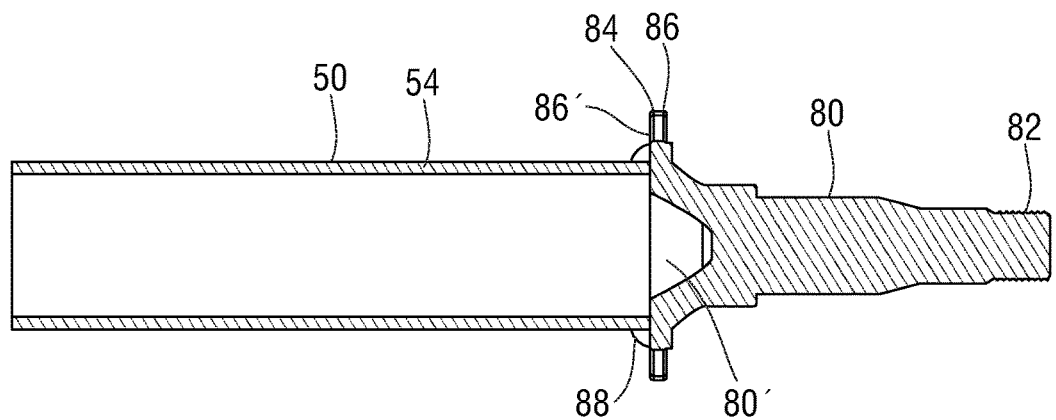
FIG. 4A is a cross-sectional view of the axle and spindle assembly of FIG. 4 taken along section-line 4A-4A.

FIGS. 4 and 4A of an axle and spindle assembly configured according to the flat back welding method of the prior art. In the flat back welding method, as compared to the butt welding method described above with respect to FIGS. 2-2C, axle 50 which is again in the form of a hollow tube is connected to a spindle 80 that is configured to be connected to the axle 50 via the flat back welding method. The spindle 80 includes a first or wheel end 82 and a second or axle end 84. A flange member 86 is positioned at the second or axle end 84. One end 50' of the axle or tube 50 is positioned flush against, instead of tubular projection 66' that extends longitudinally from the flange member 66, flat surface 86' of flange member 86. A fillet weld 88 is then formed between the flat surface 86' of flange member 86 and outer surface 54 of the axle or tube 50.

Figure 4B:
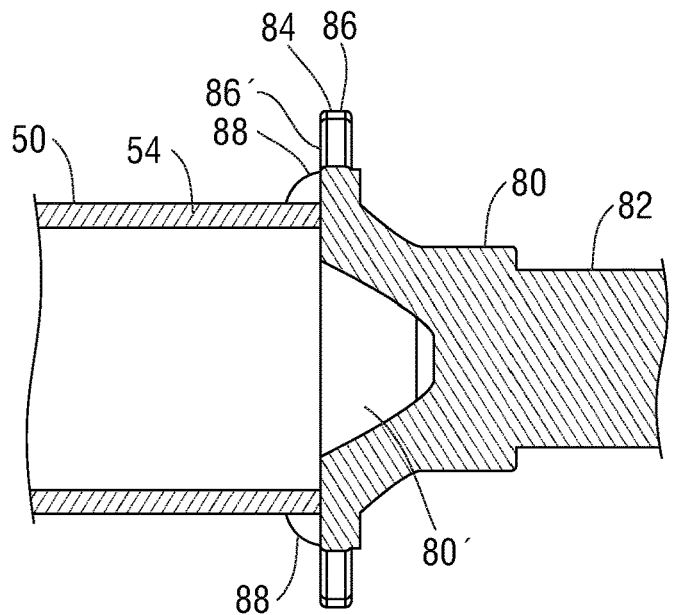
FIG. 4B is a view of Detail 4B as identified in FIG. 4A.
Figure 4C:
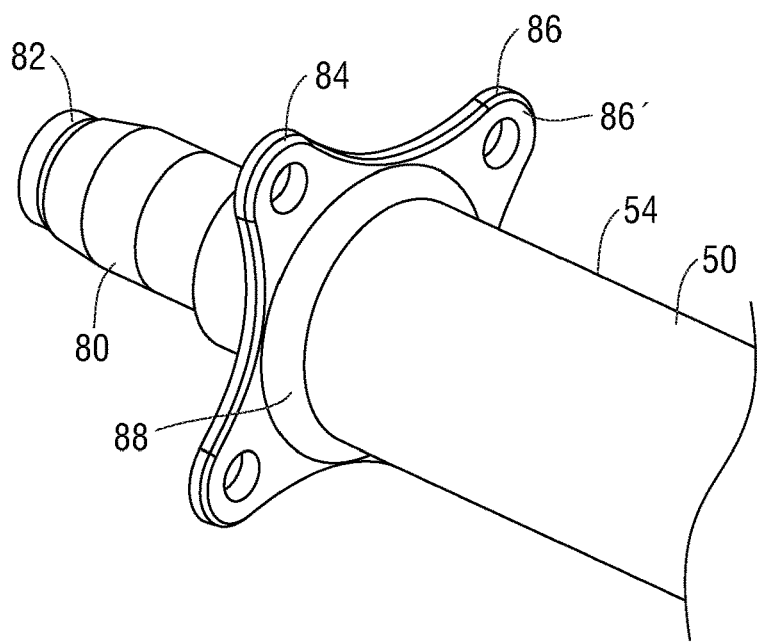
FIG. 4C is a perspective view of the axle and spindle assembly configured according to the flat back welding method of FIG. 4.

FIGS. 4B and 4C provide additional views of the fillet weld 88 and the connection between the spindle 80 and the axle or tube 50. FIGS. 4A and 4B illustrate the internal volume 80' formed within the spindle 80 that extends from second or axle end 84 partially towards the first or wheel end 82 of the spindle.

In the flat back welding method, the spindle 80 and tube 50 require elaborate alignment jigs (not shown) to assure concentricity and perpendicularity. The bending stresses are also imposed on the weld 88, which as described above is generally a fillet weld.

Figure 5A:
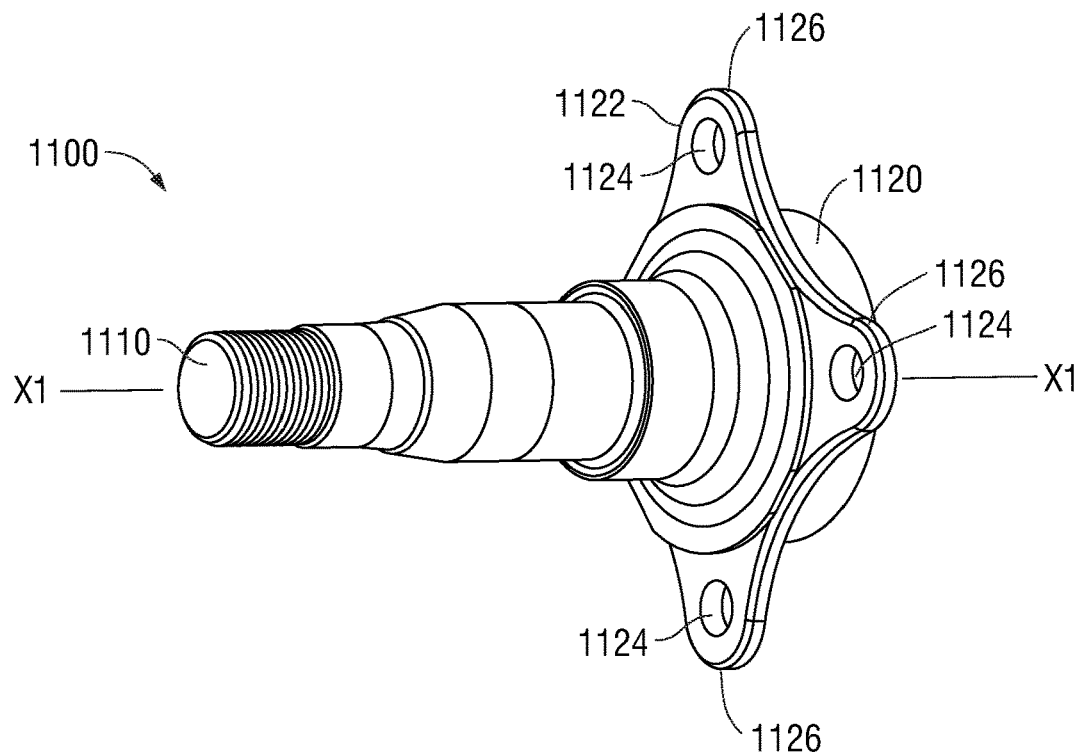
FIG. 5A is a perspective view of the wheel end of a spindle for an axle and wheel end assembly and which is configured according to one embodiment of the present disclosure.
Figure 5B:
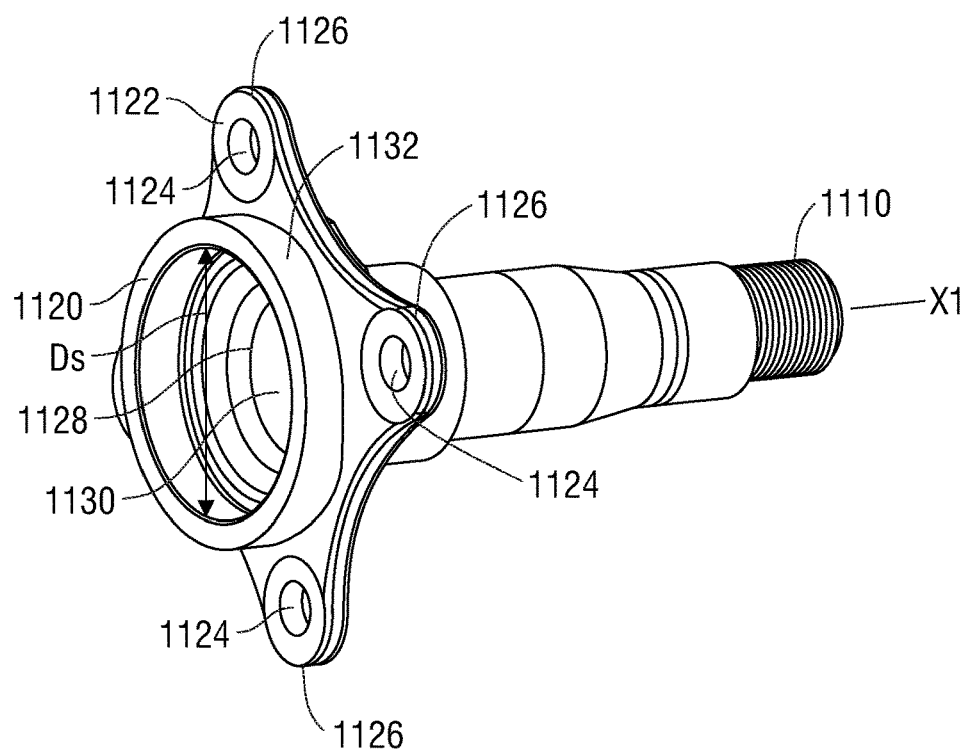
FIG. 5B is a perspective view of the axle end of the spindle for an axle and wheel end assembly of FIG. 5A.
Figure 6:
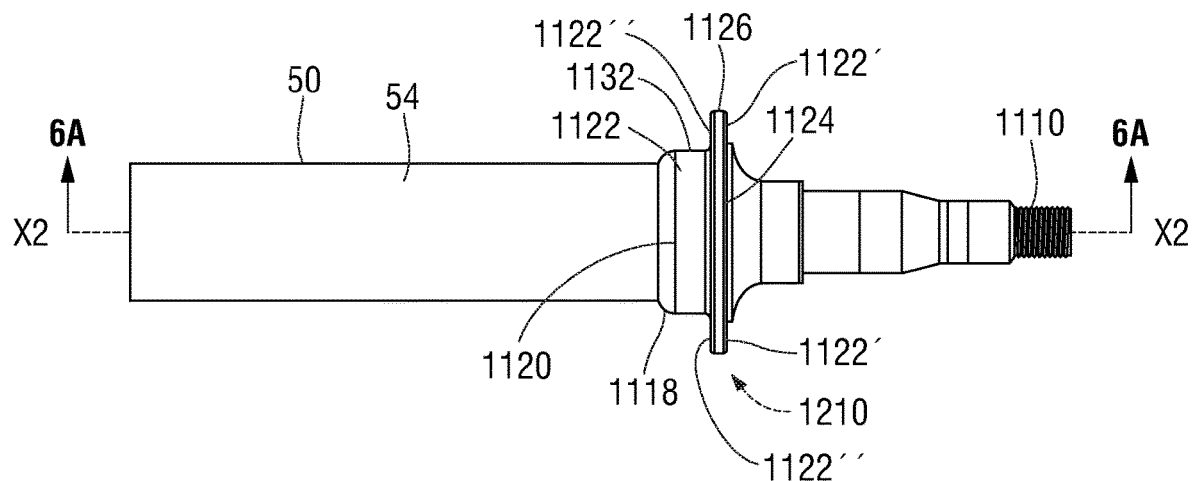
FIG. 6 is a view of an axle and spindle assembly wherein the spindle is configured according to the extended spindle socket hub method according to one embodiment of the present disclosure.
Figure 6A:
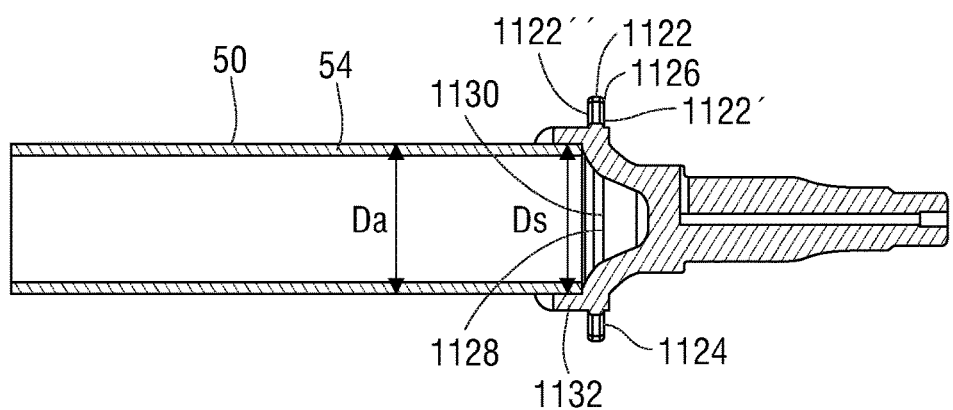
FIG. 6A is a cross-sectional view of the axle and spindle assembly of FIG. 6 taken along section-line 6A-6A.
Figure 6B:
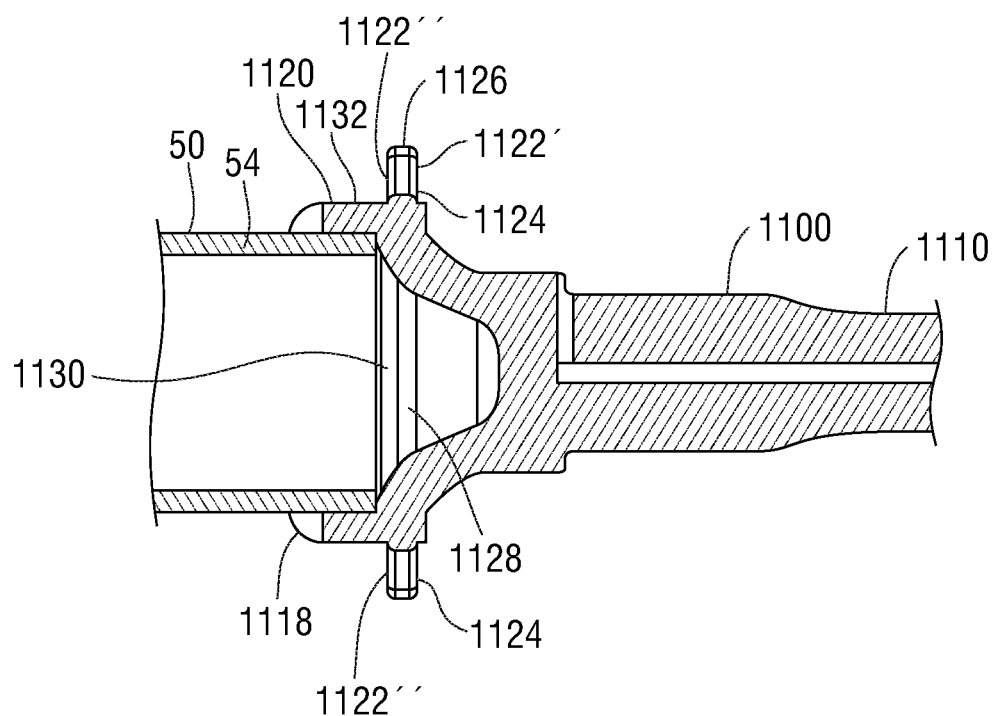
FIG. 6B is a view of Detail 6B as identified in FIG. 6A.
Figure 6C:
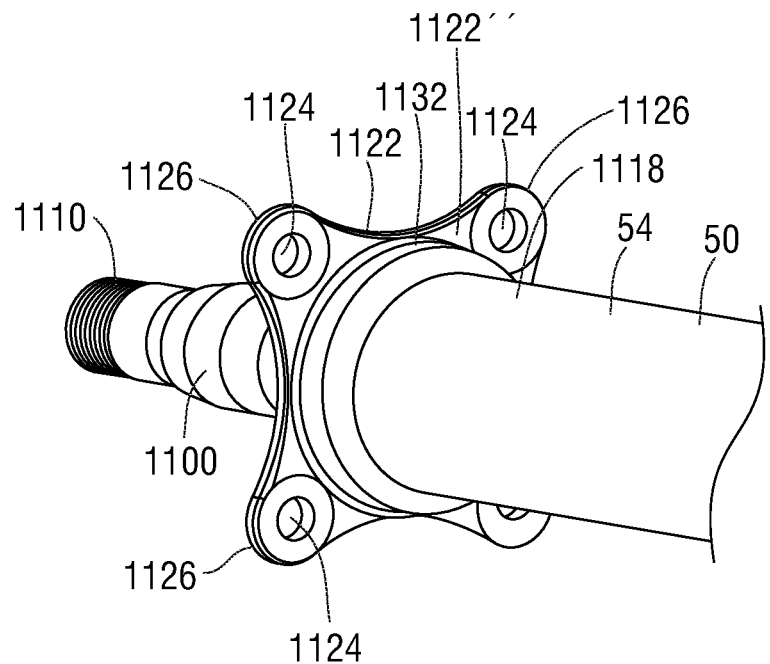
FIG. 6C is a perspective view of the axle and spindle assembly configured according to the extended spindle socket hub method of FIG. 6.
Figure 7:
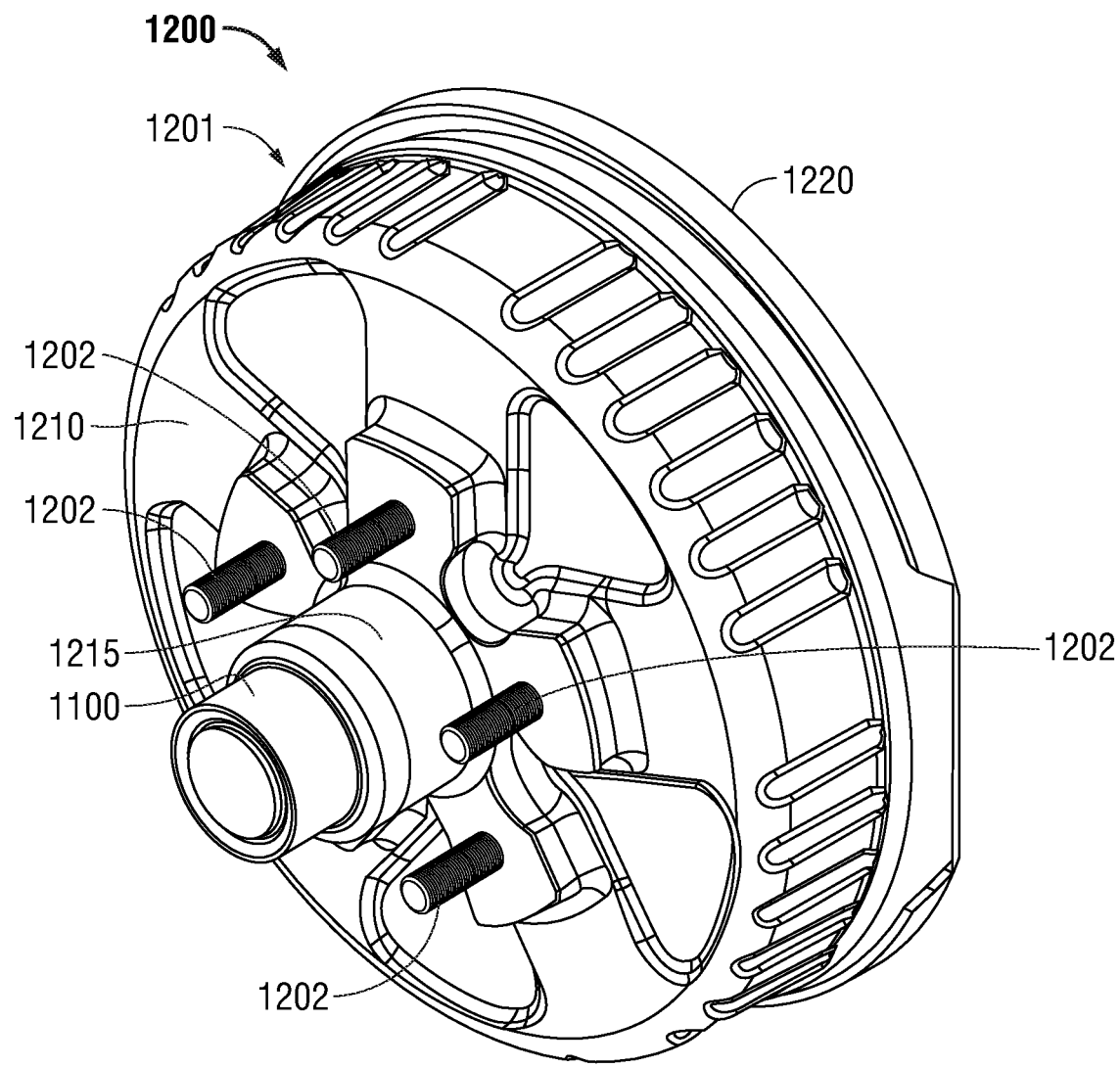
FIG. 7 is a perspective view of a wheel end assembly that is designed to support a particular vehicle load and be mounted with the axle and spindle assembly of FIGS. 5A-6C to form a wheel end and spindle assembly according to one embodiment of the present disclosure.
Figure 7A:
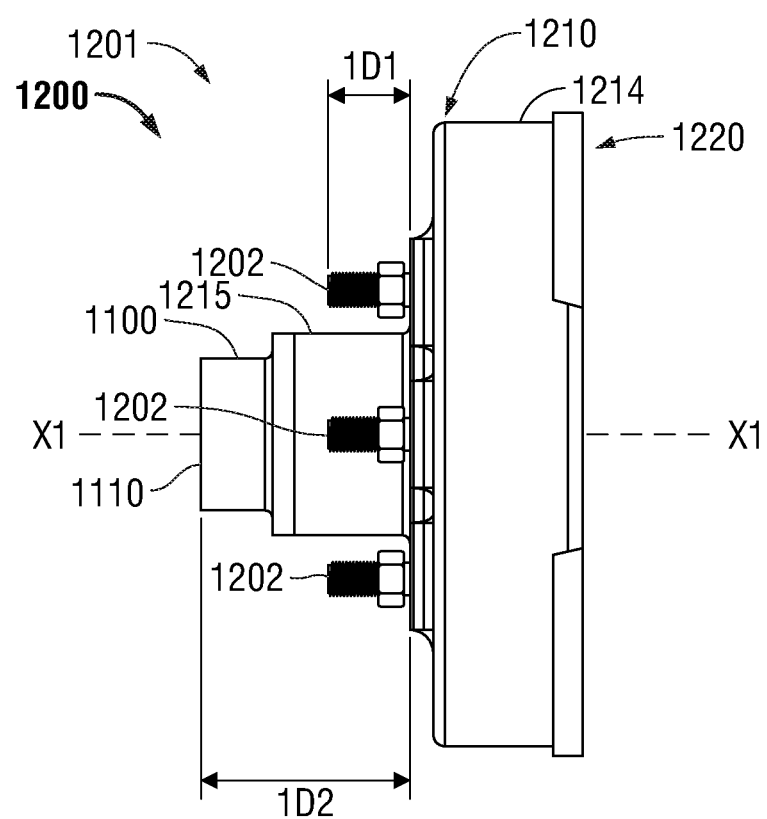
FIG. 7A is an elevation view of the wheel end assembly of FIG. 7 illustrating certain dimensions.
Figure 7B:
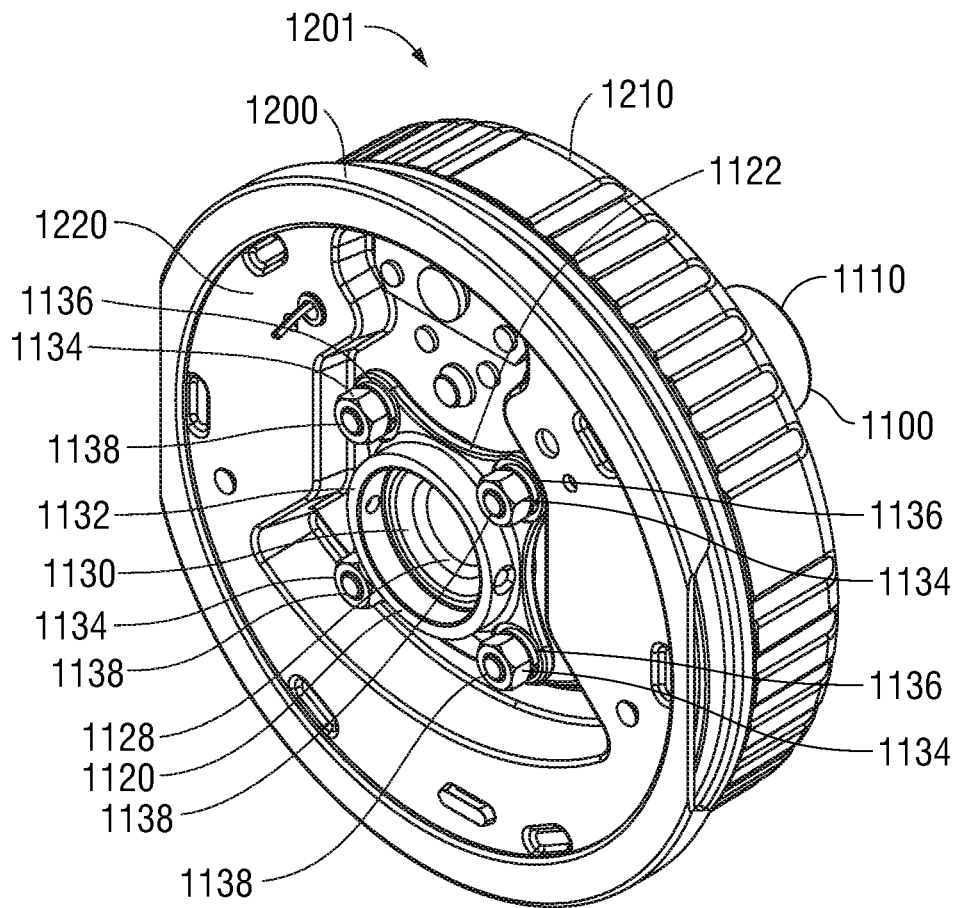
FIG. 7B is a perspective view of the axle end of the wheel end and spindle assembly of FIG. 7A.
Figure 7C:
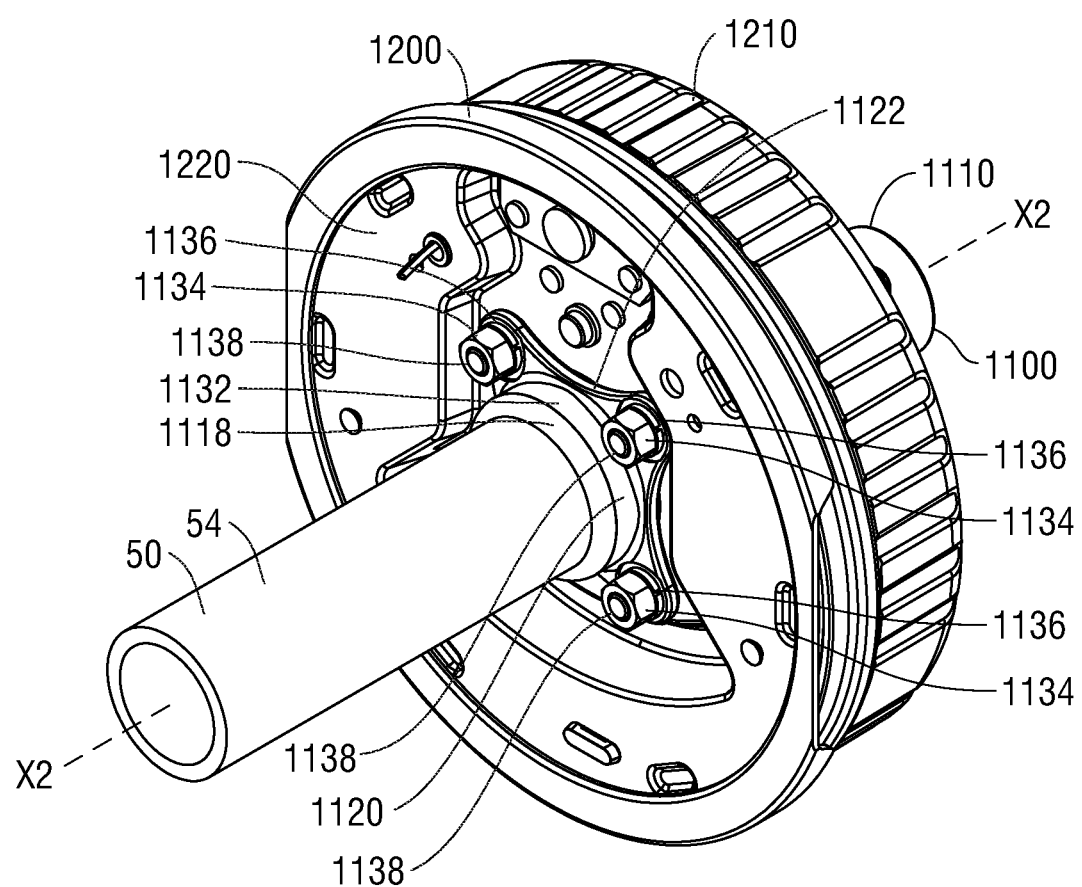
FIG. 7C is a perspective view of the axle end of the wheel end and spindle assembly of FIG. 7A further including an axle that is connected to the wheel end assembly according to one embodiment of the extended spindle socket hub method of the present disclosure.

Turning now to the embodiments of the present disclosure, the embodiments of the present disclosure include, as illustrated in FIGS. 5A-5B, 6, 6A, 6B and 6C, a spindle 1100 that includes an extended spindle socket hub for a wheel end assembly 1200 as illustrated in FIGS. 7A, 7B and 7C, wherein the wheel end assembly 1200 is configured to define a first side 1210 configured to receive a wheel of a vehicle and a second side 1220 (see FIG. 7B) configured to receive an axle of a vehicle (neither the axle nor the wheel nor the vehicle are shown).

Turning again to FIGS. 5A and 5B, the spindle 1100 extends longitudinally to define a longitudinal axis X1-X1 from a first end or wheel end 1110 of the spindle 1100 to a second end or axle end 1120 of the spindle 1100.

The first end 1110 is configured to receive the wheel of a vehicle (neither the wheel nor the vehicle are shown) on the first side 1210 of the wheel end assembly 1200. The second end 1120 of the spindle 1100 is configured to receive the axle of a vehicle (neither the axle nor the vehicle are shown) on the second side 1220 of the wheel end assembly 1200.

Further referring to FIGS. 6, 6A and 6B, the axle or tube 50 of a vehicle defines a longitudinal axis X2-X2 that extends from the first side 1210 (as shown by the phantom arrow) of the wheel assembly 1200, or more particularly on wheel side 1122' of flange 1122.

As best shown in FIGS. 5A-5B, the second end 1120 of the spindle 1100 defines a flange 1122 that is configured to enable a plurality of mounting members, e.g., threaded press-in studs 1138 in FIGS. 7B and 7C described below, to be received through corresponding apertures 1124 in radially extending projections 1126 of the flange 1122. The second end 1120 also defines a socket joint 1128 that is structurally incorporated into a central aperture 1130 of the flange 1122. The socket joint 1128 is configured to receive the axle or tube 50 of the vehicle on the second side 1220 of the wheel end assembly 1200, or more particularly on axle side 1122" of flange 1122. A cylindrical section 1132 of the socket joint 1128 concentrically defines the central aperture 1130 and overlaps the external surface 54 of the axle or tube 50 when the end 50' is received within the socket joint 1128.

FIG. 7 is a perspective view of a wheel end assembly 1200 that is designed to support a particular vehicle load and be mounted with the axle and spindle assembly 1100 of FIGS. 5A-6C to form a wheel end and spindle assembly 1201 according to one embodiment of the present disclosure.

FIG. 7A is an elevation view of the wheel end and spindle assembly 1201 of FIG. 7 illustrating certain dimensions.

FIG. 7B is a perspective view of the axle end or second side 1220 of the wheel end and spindle assembly 1201 of FIG. 7A.

FIG. 7C is a perspective view of the axle end or second side 1220 of the wheel end and spindle assembly 1201 of FIG. 7A further including axle 50 that is connected to the wheel end assembly 1200 according to one embodiment of the extended spindle socket hub method of the present disclosure. More particularly, in FIG. 7A, mounting members 1202 are configured to extend from the first side 1210 of the wheel end assembly 1200 and along the longitudinal axis X1-X1 of the spindle 1100 to define a first distance 1D1 from the first side 1210 of the wheel end assembly 1200. The first end 1110 of spindle 1100 extends a second distance 1D2 from the first side 1210 of the wheel end assembly 1200. that is greater than the first distance 1D1. The mounting members 1202 are configured to receive the hub of a wheel (not shown) to secure the hub and wheel to the wheel end and spindle assembly 1201 and also to secure brake drum 1214 to other components of wheel end assembly 1200.

Cylindrical projection 1215 extends from the first side 1210 and forms a cylindrical enclosure for spindle 1100.

Referring also to FIGS. 7D and 7E in conjunction with FIGS. 6 to 6D, the mounting members, e.g., threaded press-in studs 1138, extend from the second side 1122" of flange 1122 to define a first distance 2D1 between the second side 1122″ and the extreme end 1138′ of the mounting members, e.g., threaded press-in studs 1138. The cylindrical section 1132 of the socket joint 1128 extends from the second side 1122″ of flange 1122 of the wheel end assembly 1200 and along the longitudinal axis X2-X2 of the axle 50 of a vehicle to define a second distance 2D2 from the second side 1122″ of flange 1122 of the wheel end assembly 1200 to extreme end 1132′ of cylindrical section 1132 of socket joint 1128. The extreme end 1132′ concentrically defines the central aperture 1130 and overlaps the external surface 54 of the axle or tube 50 when the end 50′ is received within the socket joint 1128 to abut internal surface 1132″ of the socket joint 1128 to enable a fillet weld 1118 to be formed in the corner formed by the extreme end 1132′ of cylindrical section 1132 and external surface 54 of the axis or tube 50. End 50′ extends into the central aperture 1130 of socket joint 1128 as far as internal surface 1132″ to define a third distance 2D3 establishing the degree of overlap of the socket joint 1128 over the axle or tube 50. Internal surface 1132″ is generally a flat or linear surface that interfaces with the generally flat surface of end 50′ of the axis or tube 50. Thus, third distance 2D3 extends from extreme end 1132′ of cylindrical section 1132 to internal surface 1132″ that interfaces with the end 50′ of the axis or tube 50. Both internal surface 1132″ and end 50′ are generally concentric to the longitudinal axis X2-X2 of the axle 50. Depending on the application or desired fit, internal surface 1132″ and end 50′ may alternatively be tapered, partially linear, non-linear, or curved interfacing surfaces. For example, interfacing surface 1135 shown as a dashed line in FIG. 7E illustrates a curved interface between internal surface 1132″ and end 50′.

Referring to FIGS. 6A and 6B, it can be seen that cylindrical section 1132 defines an internal diameter Ds that is greater than an outer diameter Da of the axle or tube 50. Since the third distance 2D3 represents the depth of the socket joint 1128 and thus the degree of overlap of the socket joint 1128 over the axle or tube 50, third distance 2D3 is correlated with the outer diameter Da of the axle or tube 50 wherein the ratio of 2D3/Da is generally within the range of 8% to 20% but other values outside of this range may also be applied by those skilled in the art as circumstances warrant having the benefit of the present disclosure.

Thus, the ratios of 2D3/Da are selected to be sufficient to enable the spindle 1100 to be welded to the axle 50 of a vehicle via the fillet weld 1118 when or after the mounting members 1138 have been received through the flange 1122 of the spindle 1100 to secure the spindle to the wheel assembly. In FIGS. 7D and 7E, third distance or dimension 2D3 determines the axial length of the axle or tube 50 that is overlapped by the concentric cylindrical section 1132 via the internal diameter Ds that is greater than outer diameter Da of the axle or tube 50.

A journal is machined inside the central aperture 1130 of the socket joint 1128 to create a pilot surface 1133 for the axle or tube 50. The axle or tube 50 is then inserted into the central aperture 1130 of the socket joint 1128 to interface with the pilot surface 1133. The insertion and fitting of the axle or tube 50 may be performed manually or by mechanically press fitting.

The method enables a very accurate fit since the external diameter Da of the axle or tube 50 is maintained to close tolerances while the machining of the journal inside the central aperture 1130 of the socket joint 1128 to create the pilot surface 1133 is also performed at close tolerances.

Following insertion of the axle or tube 50 into the socket joint 1128, socket or fillet weld 1118 may then be formed in the corner formed by the extreme end 1132′ of cylindrical section 1132 and external surface 54 of the axis or tube 50.

The fit between the axle or tube 50 and the cylindrical section 1132 of the spindle 1100 assures concentricity and perpendicularity without elaborate and expensive jigging and can be considered to be "self-jigging".

The fit accommodates some of the bending stresses, such that less than 100% of the bending stresses are imposed on the socket or fillet weld 1118 and thus the bending stresses are partially imposed on the cylindrical section 1132, thereby reducing the bending stresses that are imposed on the socket or fillet weld 1118 as compared to the bending stresses imposed on the welds of the prior art designs of FIGS. 2-4B described above.

The configuration of the axle or tube 50 inserted into the inside the central aperture 1130 of the socket joint 1128 enables the central aperture 1130 to be larger as compared to the prior art, thereby reducing the required weight and cost The configuration of the axle or tube 50 inserted into the inside the central aperture 1130 of the socket joint 1128 enables welding clearance when welding a completely assembled wheel end assembly 1200 to the axle or tube 50 when the brake assembly nuts 1134 are already mounted to flange 1122 of the spindle 1100, as in FIG. 7C.

Figure 7F:
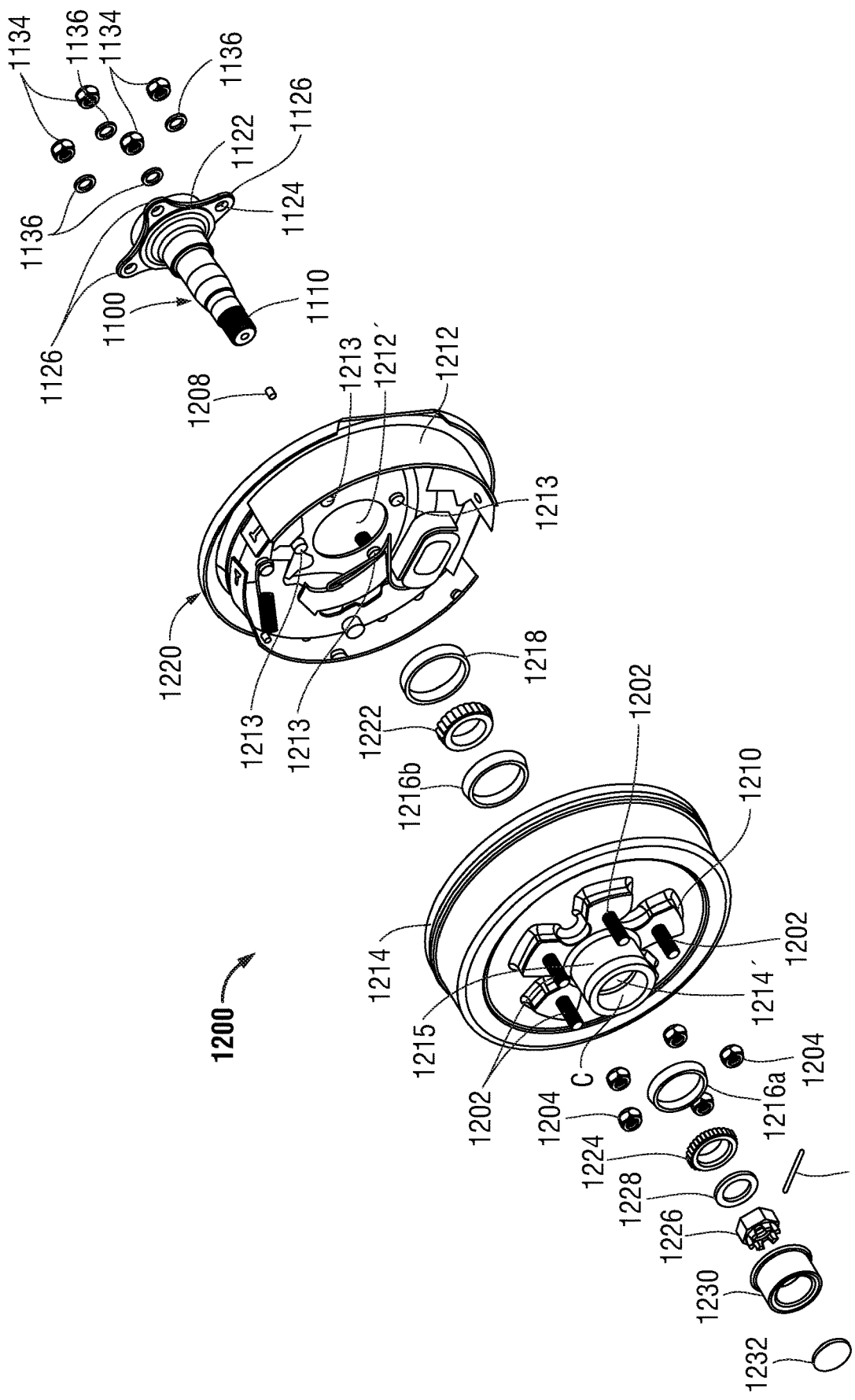
FIG. 7F is an exploded perspective view of the wheel end and spindle assembly of FIGS. 7A-7D.

FIG. 7F is an exploded perspective view of the spindle 1100 and wheel end assembly 1200. First end or wheel end 1110 of the spindle 1100 interfaces a central aperture 1212′ defined by electric brake assembly 1212 that is included in the wheel end assembly 1200. The first end or wheel end 1110 of spindle 1100 is positioned through central aperture 1212′ on the axle or second end 1220 and through a central aperture 1214′ defined by brake drum 1214 via cylindrical projection 1215 positioned at center C of the brake drum 1214. Cylindrical projection 1215 extends from the first side or wheel side 1210 of the wheel end assembly 1200. The first end or wheel end 1110 of spindle 1100 is positioned through first or wheel end 1210 via consecutively a spring loaded seal 1218, tapered cone ring bearings 1222 and a tapered cup 1216b that are positioned between the electric brake assembly 1212 and the brake drum 1214.

On the wheel end 1210 of the wheel end assembly 1200, the first end or wheel end 1110 of the spindle 1100 is then secured consecutively via a tapered cup 1216a, tapered cone ring bearings 1224, an O-washer 1228 and castle nut 1226 and cotter pin 1234 and further by a dust cap 1230 for the aperture 1214′ and flexible material 1232 for insertion into the hole of the dust cap 1230.

The spindle 1100 and wheel end assembly 1200 are then secured via press-in studs 1138 (see FIGS. 7B and 7C) through apertures 1213 in the electric brake assembly 1212 that are aligned with apertures 1124 in the flange 1122 of the spindle 1100. The press-in studs 1138 are secured on the axle side 1122″ of flange 1122 via threaded brake assembly nuts 1134 that are mounted over washers 1136 and that may be helical spring-lock washers, wherein the threads of nuts 1134 engage with the threaded surfaces of the press-in studs 1138.

Not shown is the axle 50 that may then be inserted into the axle end 1120 of the spindle and welded to the spindle 1100 after assembly of the spindle 1100 to the wheel end assembly 1200.

Figure 8:
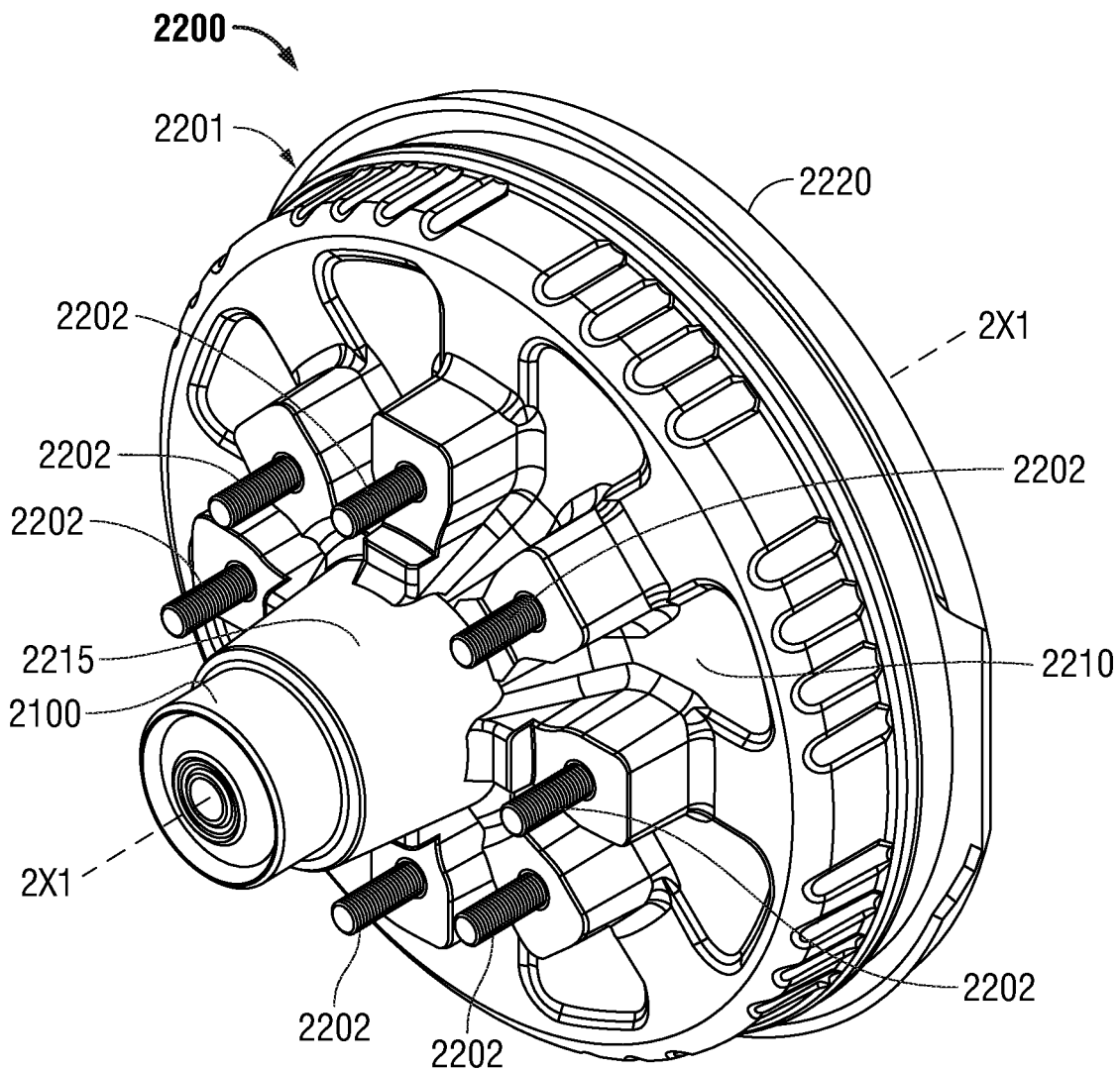
FIG. 8 is a perspective view of a wheel end assembly that is designed to support a vehicle load that is greater as compared to the vehicle load of the wheel end assembly of FIGS. 7-7F and is designed to form a wheel end and spindle assembly according to one embodiment of the present disclosure.

FIG. 8 is a perspective view of a wheel end assembly 2200 that is designed to support a vehicle load that is greater as compared to the vehicle load of the wheel end assembly 1200 of FIGS. 7-7F and is designed to form a wheel end and spindle assembly 2201 according to one embodiment of the present disclosure. In view of the general similarities between wheel end and spindle assembly 2201 and wheel end and spindle assembly 1201 of FIGS. 7-7F, numbering of components for wheel end and spindle assembly 2201 will be generally incremented by 1000 as compared to the numbering of components of wheel end and spindle assembly 1201.

Figure 8A:
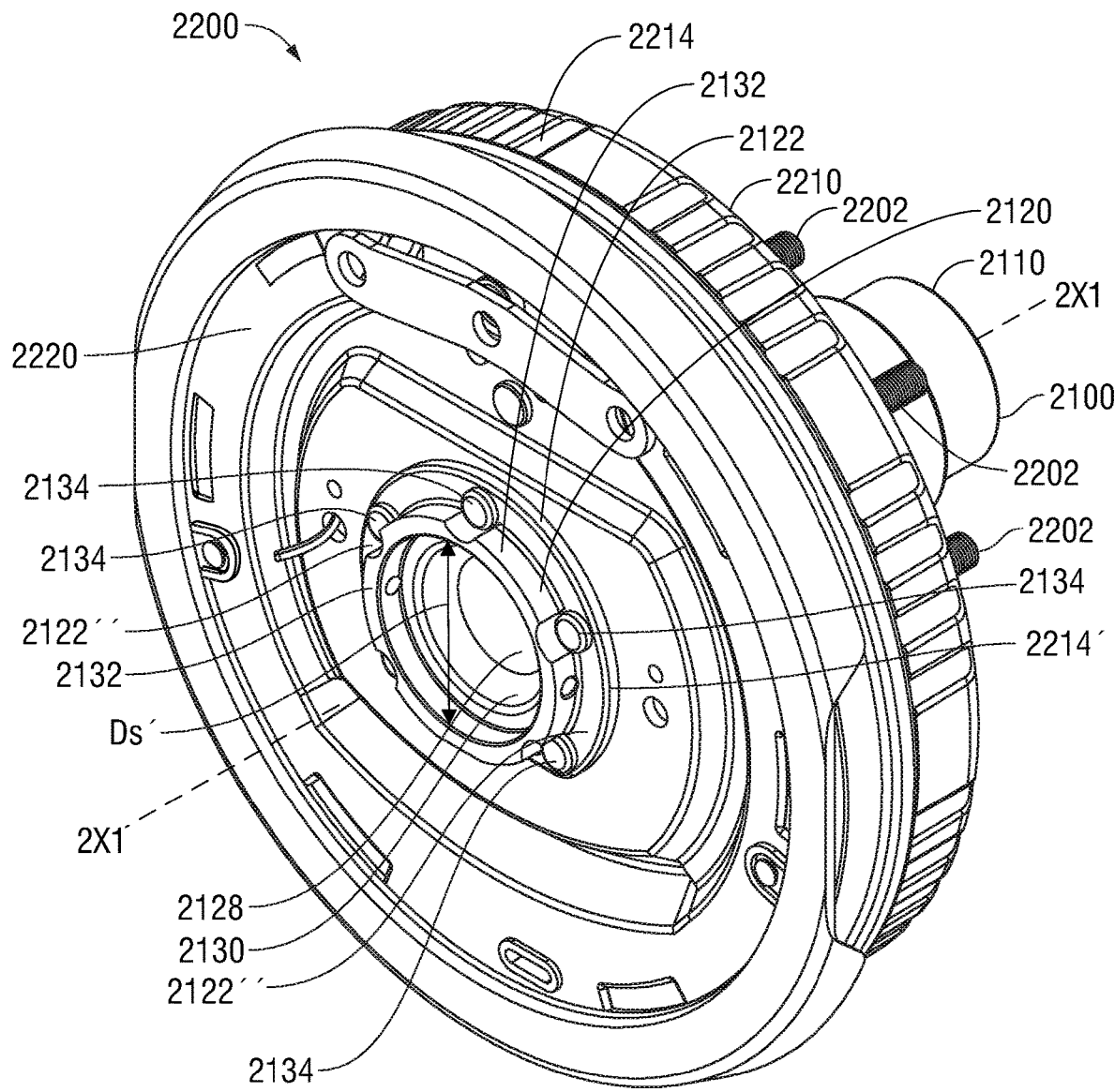
FIG. 8A is a perspective view of the axle end of the wheel end and spindle assembly of FIG. 8.

FIG. 8A is a perspective view of the axle end 2220 of the wheel end and spindle assembly 2201 of FIG. 8.

FIG. 8B is a cross-sectional elevation or side view of axle 150 and wheel end and spindle assembly 2201 of FIGS. 8-8A mounted with the wheel end assembly 2200 to form the wheel end and spindle assembly 2201 and illustrating the dimensions that enable implementation of the extended spindle socket-hub method according to embodiments of the present disclosure.

FIG. 8C is an enlarged view of detail 8C in FIG. 8B illustrating certain dimensions.

While there are obvious differences between wheel end and spindle assembly 1201 and wheel end and spindle assembly 2201 that will become apparent in the description below, the overall methodology of the extended spindle socket-hub applied to inserting axle or tube 150 into aperture 2130 of wheel end and spindle assembly 2201 is the same as that applied to inserting axle or tube 50 into aperture 1230 of wheel end and spindle assembly 1201 described above with respect to FIGS. 5A to 7F.

Referring again to FIG. 8, mounting members 2202 are configured to extend from first side 2210 of the wheel end assembly 2200 and along the longitudinal axis 2X1-2X1 of spindle 2100 to define distances (not shown) that are analogous to first distance 1D1 from the first side 1210 of the wheel end assembly 1200 and to second distance 1D2 which defines the distance which first end 1110 of spindle 1100 extends from the first side 1210 of the wheel end assembly 1200 that is greater than the first distance 1D1, as shown in FIG. 7A. In a similar manner, mounting members 2202 are configured to receive the hub of a wheel (not shown) to secure the hub and wheel to the wheel end and spindle assembly 2201 and also to secure brake drum 2214 to other components of wheel end assembly 2200.

Cylindrical projection 2215 extends from the first side 2210 and forms a cylindrical enclosure for spindle 2100 and is concentric to the longitudinal axis 2X1-2X1 of spindle 2100.

Figure 8D:
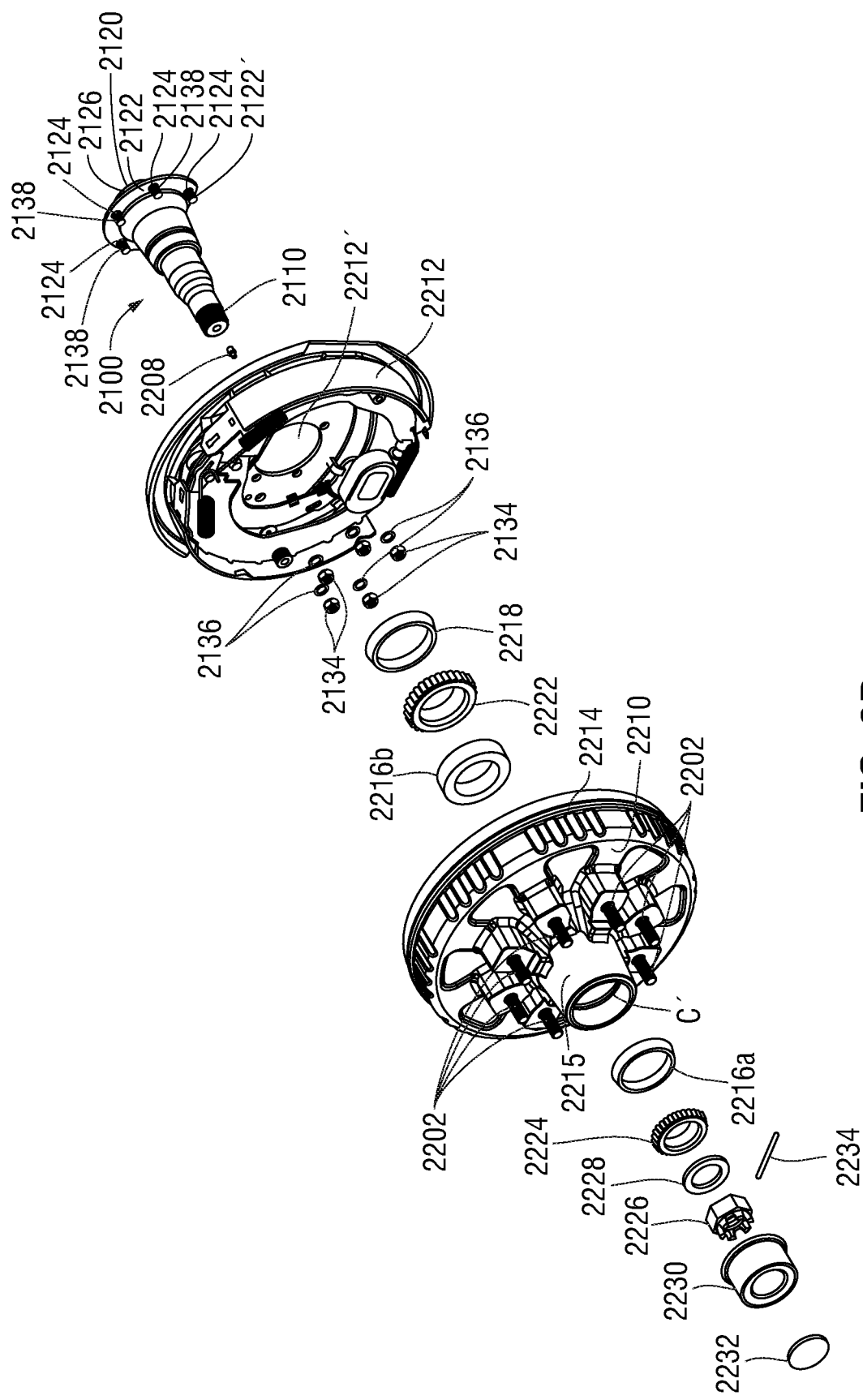
FIG. 8D is an exploded perspective view of the wheel end and spindle assembly of FIGS. 7A-7D.

Referring to FIG. 8A and to FIG. 8D which is an exploded perspective view of the wheel end and spindle assembly 2201 of FIGS. 8-8C, a flange member 2122 of the spindle 2100 is defined at axle or tube side 2120 of the spindle 2100 and includes a circular rim 2126 having a plurality of apertures 2124 defined therein. Flange member 2122 defines a wheel side 2122' and an axle or tube side 2122" and includes a cylindrical section 2132 extending from axle or tube side 2122". Mounting members 2138, e.g., bolts that include heads 2140, and are illustrated as having threaded shaft surfaces, are inserted from axle or tube side 2122" through the plurality of apertures 2124 towards the wheel side 2122' such that the heads 2140 extend from the second side 2122" of flange 2122 to define a first distance 2D1' between the second side 2122" and the extreme end of the mounting members 2138 at the heads 2140.

The cylindrical section 2132 of the socket joint 2128 extends from the second side 2122" of flange 2122 of the wheel end assembly 2200 and along the longitudinal axis 2X2-2X2 of the axle 150 of a vehicle to define a second distance 2D2' from the second side 2122" of flange 2122 of the wheel end assembly 2200 to extreme end 2132' of cylindrical section 2132 of socket joint 2128 that concentrically defines the central aperture 2130 and overlaps the external surface 154 of the axle or tube 150 when the end 150' is received within the socket joint 2128 to abut internal surface 2132" of the socket joint 2128 to enable a fillet weld 2118 to be formed in the corner formed by the extreme end 2132' of cylindrical section 2132 and external surface 154 of the axis or tube 150. End 150' extends into the central aperture 2130 of socket joint 2128 as far as internal surface 2132" to define a third distance 2D3' establishing the degree of overlap of the socket joint 2128 over the axle or tube 150. As with respect to internal surface 1132" and end 50' described above, internal surface 2132" is generally a flat or linear surface that interfaces with the generally flat surface of end 150' of the axis or tube 150 and both internal surface 2132" and end 150' are generally concentric to the longitudinal axis 2X2-2X2 of the axle 150. Depending on the application or desired fit, internal surface 2132" and end 150' may alternatively be tapered, partially linear, non-linear, or curved interfacing surfaces. For example, interfacing surface 2135 shown as a dashed line in FIG. 8C illustrates a curved interface between internal surface 2132" and end 150'.

Referring to FIGS. 8A and 8B, it can be seen that cylindrical section 2132 also defines an internal diameter Ds' that is greater than an outer diameter Da' of the axle or tube 150.

In FIGS. 8B and 8C, dimension 2D3' determines the axial length of the axle or tube 150 that is overlapped by the concentric cylindrical section 2132 via the internal diameter Ds' that is greater than outer diameter Da' of the axle or tube 150.

It can be seen that cylindrical section 2132 defines the internal diameter Ds' that is greater than outer diameter Da' of the axle or tube 150. Again, since the third distance 2D3' represents the depth of the socket joint 2128 and thus the degree of overlap of the socket joint 2128 over the axle or tube 150, third distance 2D3' is correlated with the outer diameter Da' of the axle or tube 150 wherein the ratio of 2D3'/Da' is generally also within the range of 8% to 20% but other values outside of this range may also be applied by those skilled in the art as circumstances warrant having the benefit of the present disclosure.

In a similar manner as with respect to wheel end and spindle assembly 1201, the ratios of 2D3'/Da' are selected to be sufficient to enable the spindle 2100 to be welded to the axle 150 of a vehicle via the fillet weld 2118 when or after the mounting members 2138 have been received through the flange 2122 of the spindle 2100 to secure the spindle 2100 to the wheel end assembly 2200.

Again, referring to FIG. 8C, a journal is machined inside the central aperture 2130 of the socket joint 2128 to create a pilot surface 2133 for the axle or tube 150. The axle or tube 150 is then inserted into the central aperture 2130 of the socket joint 2128 to interface with the pilot surface 2133. The insertion and fitting of the axle or tube 150 also may be performed manually or by mechanically press fitting.

The method enables a very accurate fit since the external diameter Da' of the axle or tube 150 is maintained to close tolerances while the machining of the journal inside the central aperture 2130 of the socket joint 2128 to create the pilot surface 2133 is also performed at close tolerances.

Following insertion of the axle or tube 150 into the socket joint 2128, socket or fillet weld 2118 may then be formed in the corner formed by the extreme end 2132' of cylindrical section 2132 and external surface 154 of the axis or tube 150.

Again, the fit between the axle or tube 150 and the cylindrical section 2132 of the spindle 2100 assures concentricity and perpendicularity without elaborate and expensive jigging and can be considered to be "self-jigging".

Similarly, the fit accommodates some of the bending stresses, therefore relieving stress from the weld such that less than 100% of the bending stresses are imposed on the socket or fillet weld 2118 and thus the bending stresses are partially imposed on the cylindrical section 2132, thereby reducing the bending stresses that are imposed on the socket or fillet weld 2118 as compared to the bending stresses imposed on the welds of the prior art designs of FIGS. 2-4B described above. The configuration of the axle or tube 150 inserted into the inside the central aperture 2130 of the socket joint 2128 enables the central aperture 2130 to be larger as compared to the prior art, thereby reducing the required weight and cost.

The configuration of the axle or tube 150 inserted into the inside the central aperture 2130 of the socket joint 2128 enables welding clearance when welding a completely assembled wheel end assembly 2200 to the axle or tube 150 when the brake assembly nuts 2134 are already mounted to flange 2122 of the spindle 2100, as in FIGS. 8A and 8B.

FIG. 8D is an exploded perspective view of the spindle 2100 and wheel end assembly 2200. First end or wheel end 2110 of the spindle 2100 interfaces a central aperture 2212' defined by electric brake assembly 2212 that is included in the wheel end assembly 2200. The first end or wheel end 2110 of spindle 2100 is positioned through central aperture 2212' on the axle or second end 2220 and through a central aperture 2214' defined by brake drum 2214 (see FIG. 8A) via cylindrical projection 2215 positioned at center C' of the brake drum 2214. As described above, cylindrical projection 2215 extends from the the first side or wheel side 2210 of the wheel end assembly 2200. The first end or wheel end 2110 of spindle 2100 is positioned through first or wheel end 2210 via consecutively a spring loaded seal 2218, tapered cone ring bearings 2222 and a tapered cup 2216b that are positioned between the electric brake assembly 2212 and the brake drum 2214.

In contrast to wheel end and spindle assembly 1201, mounting members 2138 are secured internally between electric brake assembly 2212 and brake drum 2214 via threaded brake assembly nuts 2134 that are mounted over washers 2136 and that may be helical spring-lock washers, wherein the threads of nuts 2134 engage with the threaded surfaces of mounting members 2138.

On the wheel end 2210 of the wheel end assembly 2200, the first end or wheel end 2110 of the spindle 2100 is then secured consecutively via a tapered cup 2216a, tapered cone ring bearings 2224, an O-washer 2228 and castle nut 2226 and cotter pin 2234 and further by a dust cap 2230 for the aperture 2214' (see FIG. and flexible material 2232 for insertion into the hole of the dust cap 2230.

Not shown is the axle 150 that may then be inserted into the axle end 2120 of the spindle 2100 and welded to the spindle 2100 after assembly of the spindle 2100 to the wheel end assembly 2200.

Those skilled in the art will recognize that and understand how other wheel end assembly designs not explicitly shown herein can be accommodated with spindles designed in an identical or similar manner as spindles 1100 and 2100 described above with respect to FIGS. 5A-8D.

Figure 9A:
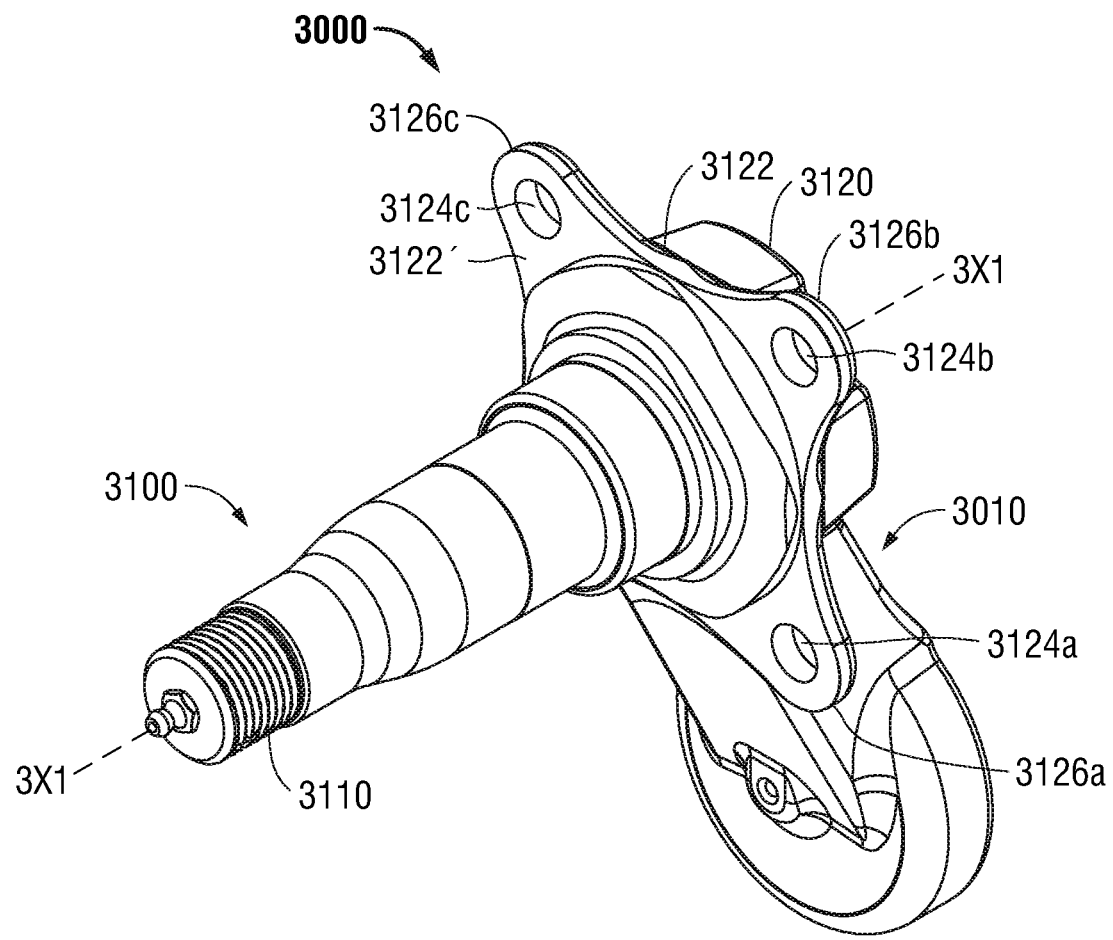
FIG. 9A is a perspective view of an embodiment of a spindle and drop arm with integrated brake flange configured to connect to an axle via the extended spindle socket hub method according to the present disclosure.

Turning now to an alternate embodiment of the present disclosure, FIG. 9A is a perspective view of an embodiment of a spindle and drop arm with integrated brake flange 3000 that is configured to connect to an axle via the extended spindle socket hub method according to the present disclosure.

Figure 9B:
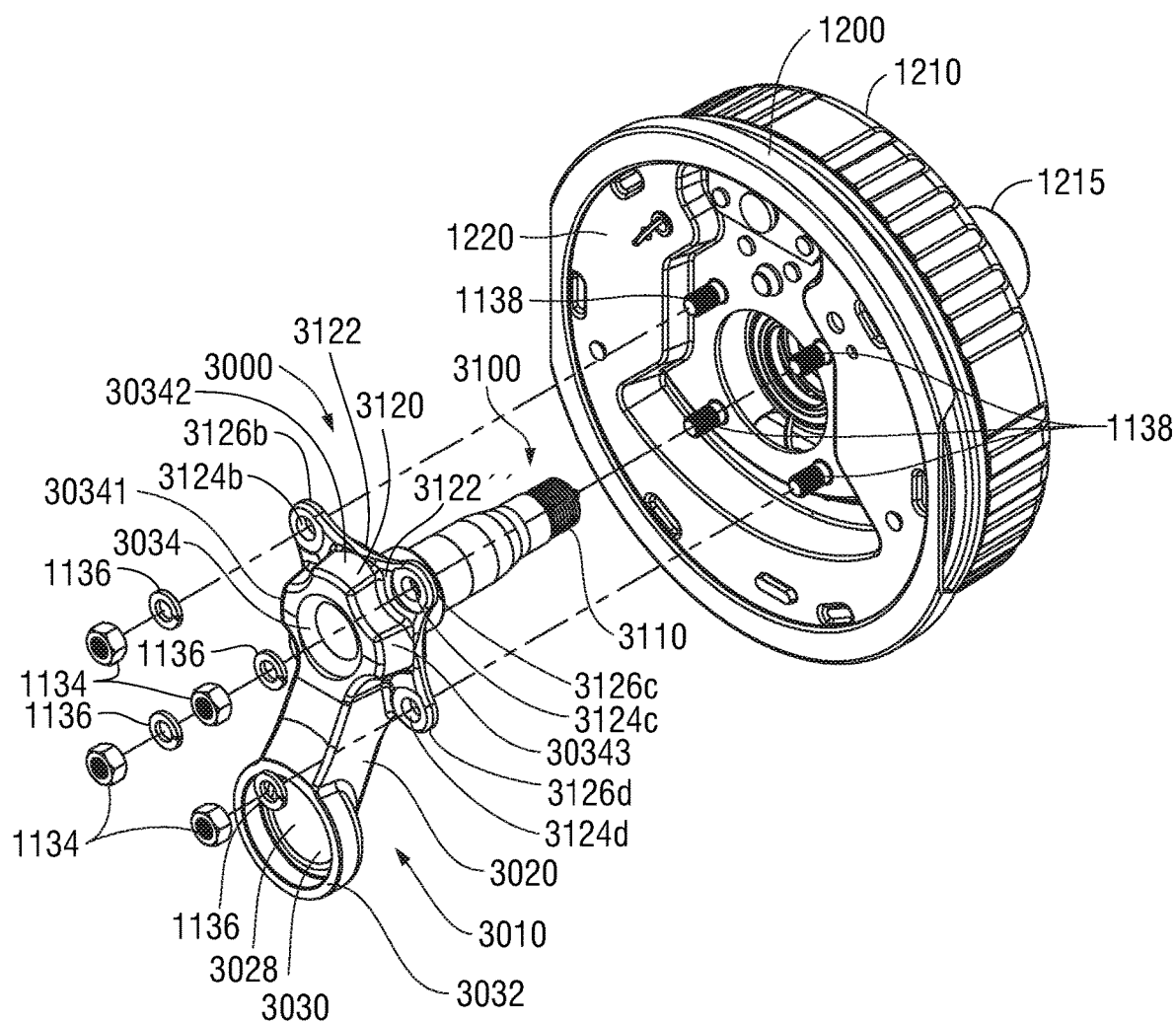
FIG. 9B is an exploded perspective view of the spindle and drop arm with integrated brake flange configured to connect to the axle end of wheel end assembly illustrated in FIGS. 7-7F.

FIG. 9B is an exploded perspective view of the spindle and drop arm with integrated brake flange 3000 that configured to connect to the axle end of wheel end assembly 1200 illustrated in FIGS. 7-7F.

Figure 9C:
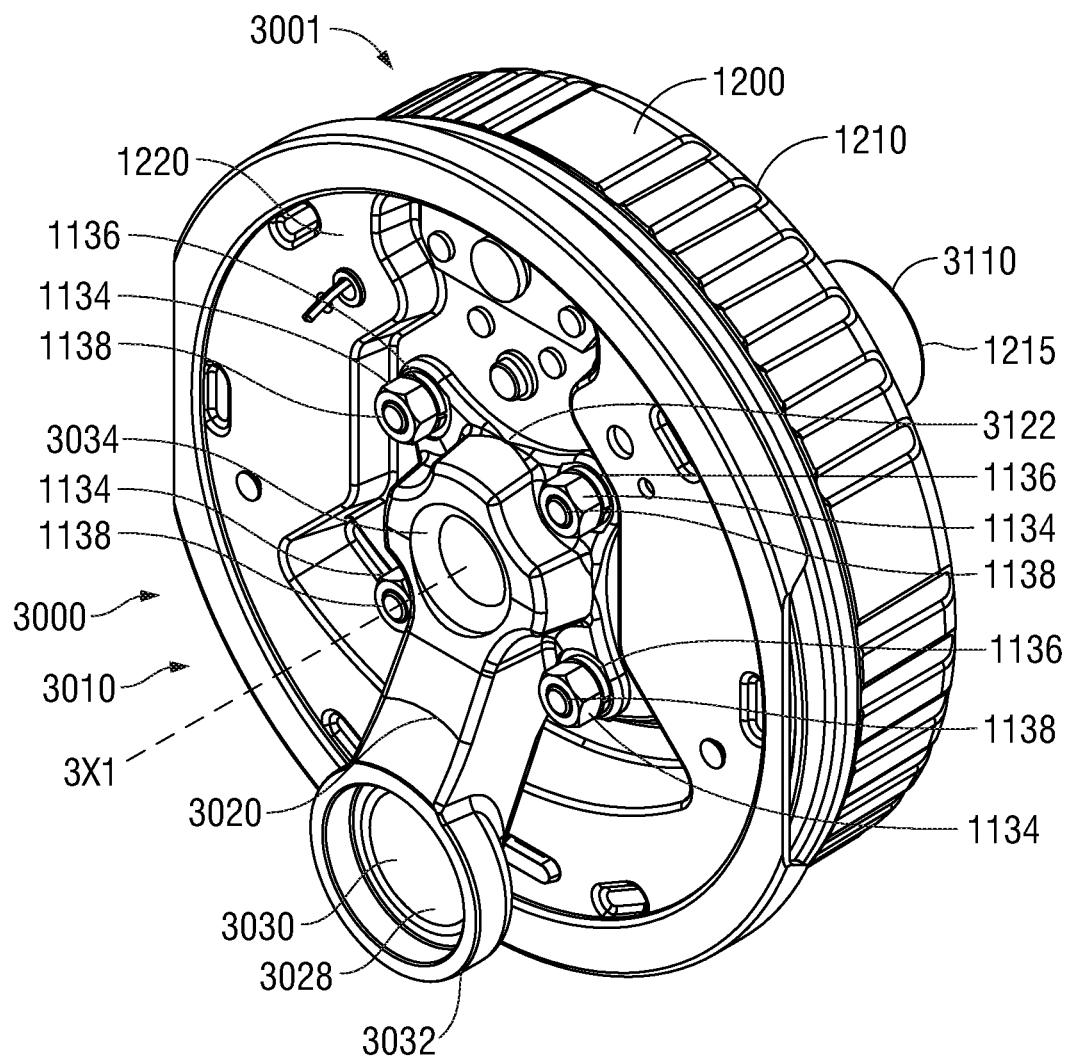
FIG. 9C is a perspective view of the spindle and drop arm with integrated brake flange connected to the axle end of wheel end assembly illustrated in FIG. 9B.

FIG. 9C is a perspective view of the spindle and drop arm with integrated brake flange 3000 connected to the axle end 1220 of wheel end assembly 1200 as illustrated in FIG. 9B to form a wheel end and spindle and drop arm with integrated brake flange assembly 3001.

Figure 9D:
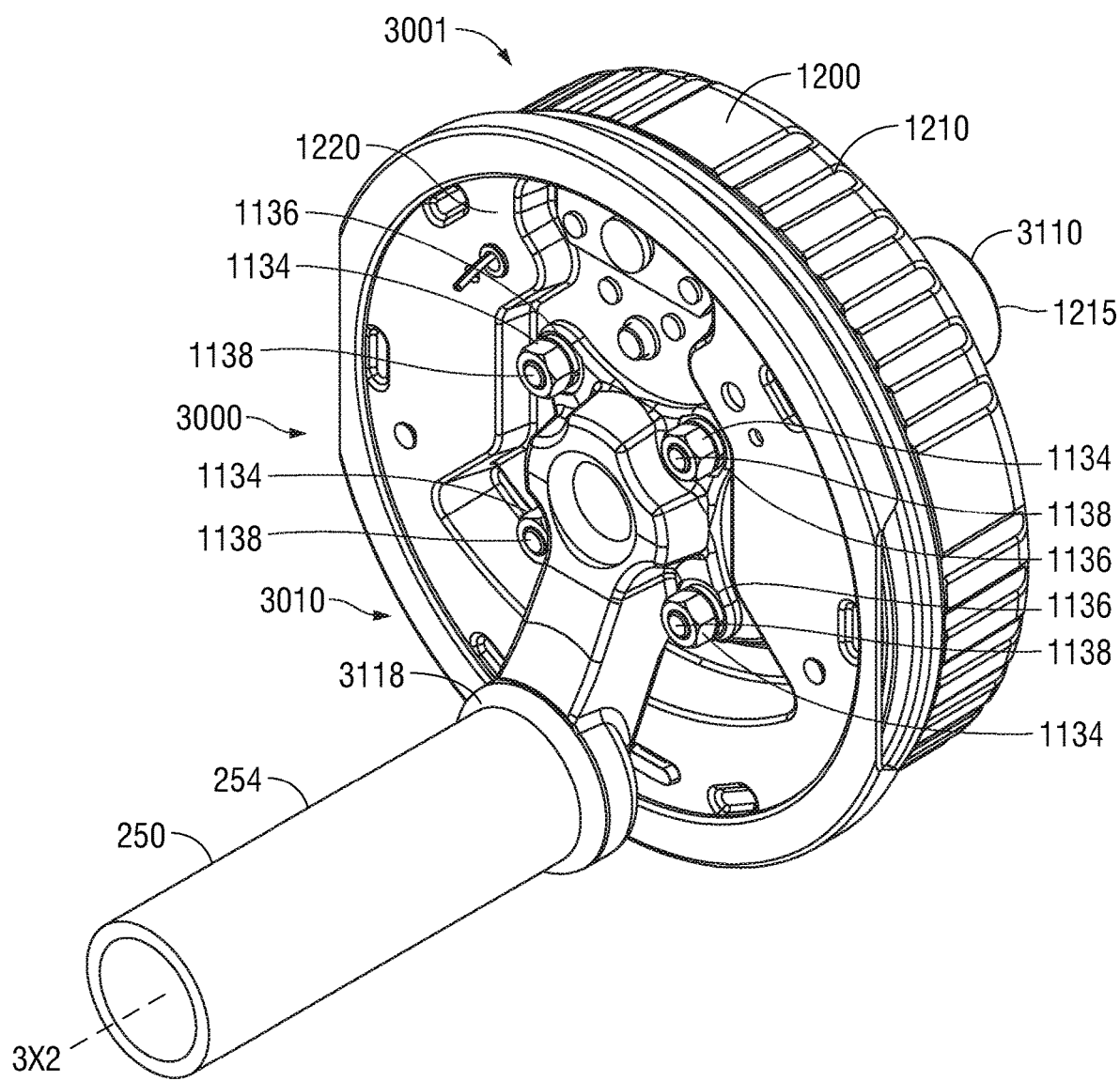
FIG. 9D is a perspective view of the spindle and drop arm with integrated brake flange of FIG. 9C connected to the wheel end of the wheel end assembly further including an axle that is connected to the spindle and drop arm with integrated brake flange of FIGS. 9A-9C according to one embodiment of the extended spindle socket hub method of the present disclosure.

FIG. 9D is a perspective view of the spindle and drop arm with integrated brake flange 3000 of FIG. 9C connected to the wheel end 1220 of the wheel end assembly 1200 to form the wheel end and spindle and drop arm with integrated brake flange assembly 3001 further including an axle 250 that is connected to the spindle and drop arm with integrated brake flange 3000 according to one embodiment of the extended spindle socket hub method of the present disclosure.

Figure 9E:
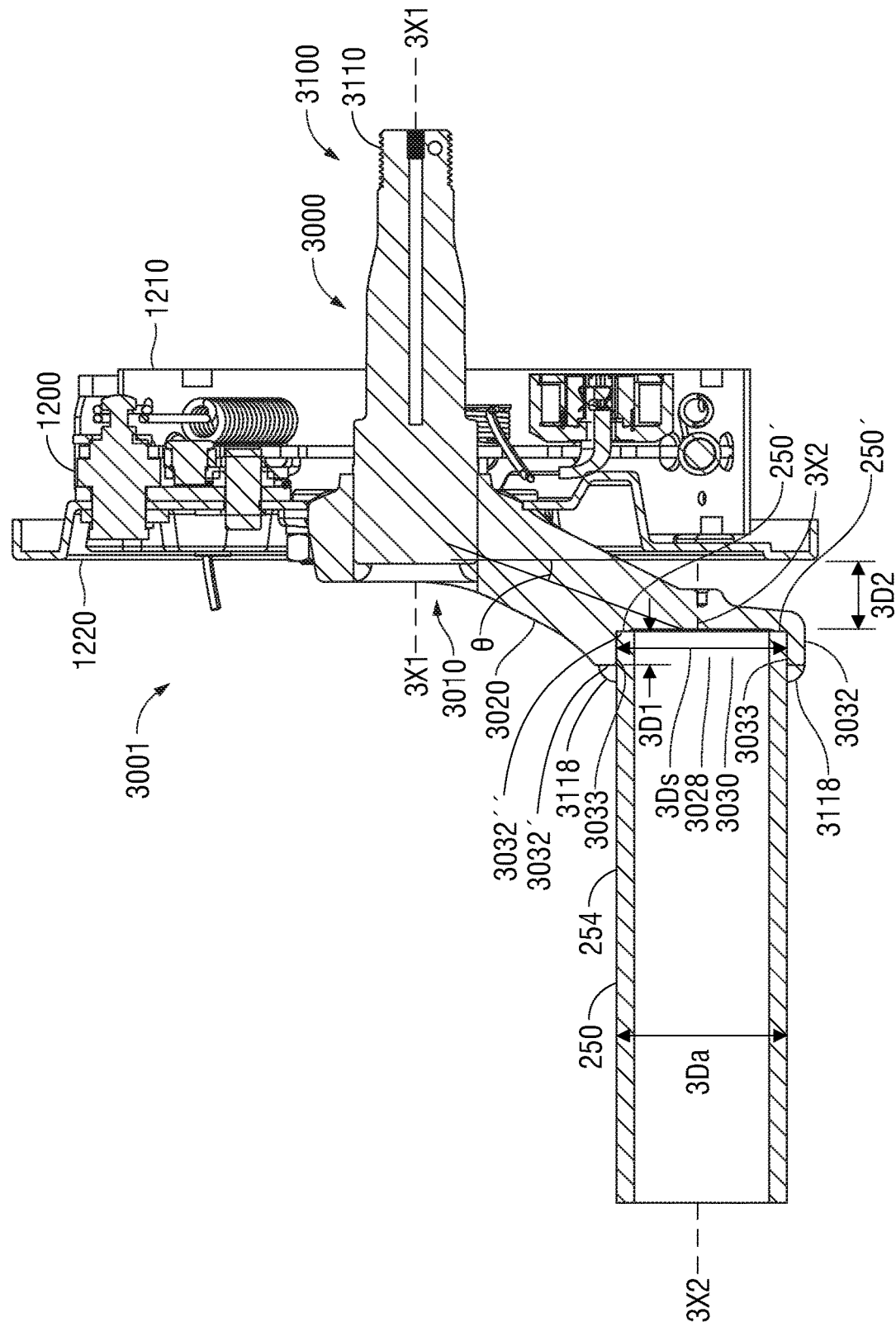
FIG. 9E is a cross-sectional elevation or side view of the spindle and drop arm with integrated brake flange and wheel end assembly of FIGS. 9A-9D illustrating the dimensions that enable implementation of the extended spindle socket-hub method according to embodiments of the present disclosure.

FIG. 9E is a cross-sectional elevation or side view of the wheel end and spindle and drop arm with integrated brake flange assembly 3001 of FIGS. 9A-9D illustrating the dimensions that enable implementation of the extended spindle socket-hub method according to embodiments of the present disclosure.

The wheel end and spindle and drop arm with integrated brake flange assembly 3001 enables vehicles with lower floor levels above the road surface to be transported.

More particularly, returning to FIGS. 9A and 9B, spindle and drop arm with integrated brake flange assembly 3000 includes a spindle 3100 that is substantially identical to spindle 1100 of FIGS. 5A-7F. In a similar manner, spindle 3100 extends longitudinally to define a longitudinal axis 3X1-3X1 from a first end or wheel end 3110 of the spindle 3100 to a second end or drop arm end 3120 of the spindle 3100.

The first end 3110 is also configured to receive the wheel of a vehicle (neither the wheel nor the vehicle are shown) on the first side 1210 of the wheel end assembly 1200. The second end or drop arm end 3120 of the spindle 3100 defines a flange 3122 that is generally similar to flange 1122 and that is configured to enable a plurality of mounting members, e.g., threaded press-in studs 1138 in FIGS. 7B and 7C described above, to be received through corresponding apertures 3124a, 3124b, 3124c and 3124d in radially extending projections 3126a, 3126b, 3126c and 3126d, respectively, of the flange 3122. The flange 3122 defines a first or wheel side 3122' and a second or axle side 3122"

However, in contrast to cylindrical section 1132 of socket joint 1128 extending from the second side 1122" of flange 1122 of the wheel end assembly 1200, as best shown in FIGS. 9B and 9C, second end 3120 of the spindle 3100 defines on axle side 3122" of the flange 3122 a drop arm portion 3010 of the spindle and drop arm with integrated brake flange assembly 3000 that includes a blunt star-shaped load-supporting member 3034 having three blunt projections 30341, 30342 and 30343, that are disposed respectively between apertures 3124a and 3124b, between apertures 3124b and 3124c and between apertures 3124c and 3124d such that clearance of apertures 3124a, 3124b, 3124c and 3124d is maintained.

The blunt star-shaped load supporting member 3034 further includes a load-supporting drop arm extension member 3020 that projects downwardly from the blunt star-shaped load supporting member 3034 between apertures 3124*a* and 3124*d* to terminate by defining a socket joint 3028 that includes a central aperture 3030. In a similar manner as with respect to socket joint 1128 described above with respect to FIGS. 5A-6C, the socket joint 3028 is configured and disposed to receive axle or tube 250 of the vehicle on the second side or axle side 1220 of the wheel end assembly 1200, or more particularly on axle side 3122" of flange 3122.

Referring to FIGS. 9D and 9E, the load-supporting drop arm extension member 3020 forms a bulk cylindrical section 3032 of the socket joint 3028 to concentrically define the central aperture 3030. The bulk cylindrical section 3032 overlaps the external surface 254 of the axle or tube 250 when the end 250' is received within the socket joint 3028.

The bulk cylindrical section 3032 of the socket joint 3028 defines a centerline axis that coincides with the longitudinal axis 3X2-3X2 of the axle 150 of a vehicle to define a first distance 3D1 by which extreme end 3032' of cylindrical section 3032 that concentrically defines the central aperture 3030 and overlaps the external surface 254 of the axle or tube 250 when the end 250' is received within the socket joint 3028 to abut internal surface 3032" of the socket joint 3028 to enable a fillet weld 3118 to be formed in the corner formed by the extreme end 3032' of cylindrical section 3032 and external surface 254 of the axis or tube 250. End 250' extends into the central aperture 3030 of socket joint 3028 as far as internal surface 3032" to define the distance 3D1 establishing the degree of overlap of the socket joint 3028 over the axle or tube 250.

Also as with respect to internal surface 1132" and end 50' described above, internal surface 3032" is generally a flat or linear surface that interfaces with the generally flat surface of end 250' of the axis or tube 250 and both internal surface 3032" and end 250' are generally concentric to the longitudinal axis 3X2-3X2 of the axle 250. Depending on the application or desired fit, internal surface 3032" and end 250' may alternatively be tapered, partially linear, non-linear, or curved interfacing surfaces, in the same manner as illustrated and described above with respect to the examples of curved interfaces 1135 in FIG. 7E and 2135 in FIG. 8C.

The load-supporting drop arm extension member 3020 extends downwardly and outwardly away from the axle or tube side 1220 of the wheel end assembly 1200 to form an angle $\theta$ such that internal surface 3032" defines a second distance 3D2 by which the internal surface 3032" extends away from the axle or tube side 1220 of the wheel end assembly 1200.

Referring to FIG. 9E, it can be seen that cylindrical section 3032 defines an internal diameter 3Ds that is greater than an outer diameter 3Da of the axle or tube 250.

Dimension 3D1 determines the axial length of the axle or tube 250 that is overlapped by the concentric cylindrical section 3032 via the internal diameter 3Ds that is greater than outer diameter 3Da of the axle or tube 250.

It can be seen that cylindrical section 3032 defines an internal diameter 3Ds that is greater than an outer diameter 3Da of the axle or tube 250. Since the distance 3D1 represents the depth of the socket joint 3028 and thus the degree of overlap of the socket joint 3028 over the axle or tube 250, distance 3D1 is correlated with the outer diameter 3Da of the axle or tube 250 wherein the ratio of 3D1/3Da is generally also within the range of 8% to 20% but other values outside of this range may also be applied by those skilled in the art as circumstances warrant having the benefit of the present disclosure.

In a similar manner as with respect to wheel end and spindle assembly 1201, the ratios of 3D1/3Da are selected to be sufficient to enable now the bulk cylindrical section 3032 of the socket joint 3028 to be welded to the axle 250 of a vehicle via the fillet weld 3118 when or after the mounting members 1138 have been received through the flange 3122 of the spindle and drop arm with integrated brake flange assembly 3000 to secure the spindle and drop arm with integrated brake flange assembly 3000 to the wheel end assembly 1200 to form the wheel end and spindle and drop arm with integrated brake flange assembly 3001.

Again, referring to FIG. 9E, a journal is machined inside the central aperture 3030 of the socket joint 3028 to create a pilot surface 3033 for the axle or tube 250. The axle or tube 250 is then inserted into the central aperture 3030 of the socket joint 3028, now at the lower or dropped elevation of centerline axis 3X2 as compared to the centerline axis 3X1 of the spindle 3100, to interface with the pilot surface 3033. The insertion and fitting of the axle or tube 250 also may be performed manually or by mechanically press fitting.

Again, the method enables a very accurate fit since the external diameter 3Da of the axle or tube 250 is maintained to close tolerances while the machining of the journal inside the central aperture 3030 of the socket joint 3028 to create the pilot surface 3033 is also performed at close tolerances.

Following insertion of the axle or tube 250 into the socket joint 3028, socket or fillet weld 3118 may then be formed in the corner formed by the extreme end 3032' of cylindrical section 3032 and external surface 254 of the axis or tube 250.

Again, the fit between the axle or tube 250 and the cylindrical section 3032 of the spindle and drop arm with integrated brake flange assembly 3000 assures concentricity and perpendicularity without elaborate and expensive jigging and can be considered to be "self-jigging".

In a similar manner, the fit accommodates some of the bending stresses, therefore relieving stress from the weld such that less than 100% of the bending stresses are imposed on the socket or fillet weld 3118 and thus the bending stresses are partially imposed on the cylindrical section 3032, thereby reducing the bending stresses that are imposed on the socket or fillet weld 3118 as compared to the bending stresses imposed on the welds of the prior art designs of FIGS. 2-4B described above. The configuration of the axle or tube 250 inserted into the inside the central aperture 3030 of the socket joint 3028 enables the central aperture 3030 to be larger as compared to the prior art, thereby reducing the required weight and cost.

The configuration of the axle or tube 250 inserted into the inside the central aperture 3030 of the socket joint 3028 enables welding clearance when welding a completely assembled wheel end and spindle and drop arm with integrated brake flange assembly 3001 to the axle or tube 250 when the brake assembly nuts 1134 are already mounted to flange 3022 of the spindle 3100, as in FIG. 9D.

Those skilled in the art will recognize that and understand how other wheel end assembly designs not explicitly shown herein can be accommodated with spindle and drop arm with integrated brake flange assemblies designed in an identical or similar manner as spindle and drop arm with integrated brake flange assembly 3000 described above with respect to FIGS. 9A-9D.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

What is claimed is:

1. A spindle configured to be received by a wheel end assembly, wherein the wheel end assembly is configured to define a first side to receive a wheel of a vehicle and a second side configured to receive an axle of the vehicle, the axle of the vehicle defining a longitudinal axis extending from the second side of the wheel end assembly, the spindle comprising:
   a first end configured to receive the wheel of the vehicle on the first side of the wheel end assembly,
   a second end configured to receive the axle of the vehicle on the second side of the wheel end assembly,
   the second end of the spindle defining a flange configured to enable a plurality of mounting members to be received therethrough and defining a socket joint configured to receive the axle of the vehicle on the second side of the wheel end assembly,
   the flange defining a wheel side on a side interfacing the wheel end assembly corresponding to the first side of the wheel end assembly and an axle side on a side interfacing the axle of the vehicle corresponding to the second side of the wheel end assembly,
   wherein when the spindle is received by the wheel end assembly, the mounting members extend distally from the axle side of the flange and along the longitudinal axis of the axle of the vehicle to extreme ends of the mounting members that are in positions extending away from the axle side of the flange to define a first distance from the axle side of the flange to the extreme ends of the mounting members that are in positions extending away from the axle side of the flange,
   the mounting members configured to secure the spindle to the wheel end assembly through the flange,
   the socket joint of the spindle extending from the second side of the wheel end assembly and along the longitudinal axis of the axle of the vehicle,
   the socket joint defining a cylindrical section concentrically defining a central aperture, the cylindrical section overlapping an external surface of the axle of the vehicle when an end of the axle is received within the central aperture of the socket joint,
   wherein an extreme end of the cylindrical section concentrically defines the central aperture to overlap the external surface of the axle of the vehicle when the end of the axle is received within the socket joint to define a second distance from the axle side of the flange to the extreme end of the cylindrical section, wherein the second distance is greater than the first distance to enable the spindle to be welded to the axle of the vehicle when the mounting members have been received through the flange of the spindle to secure the spindle to the wheel assembly.

2. The spindle configured to be received by a wheel end assembly according to claim 1, wherein the socket joint of the spindle defines a central aperture extending at least to an internal surface of the socket joint and wherein the axle of the vehicle defines the end received within the socket joint and extending into the central aperture at least to the internal surface of the socket joint to define a third distance extending from the extreme end of the cylindrical section to an internal surface that interfaces with the end of the axle establishing degree of overlap of the socket joint over the axle.

3. The spindle configured to be received by a wheel end assembly according to claim 2, wherein the axle of the vehicle defines an outer diameter and wherein the third distance establishing degree of overlap defines a ratio with respect to the outer diameter that ranges from 8% to 20%.

4. A combination spindle and wheel end assembly comprising:
   a wheel end assembly configured to define a first side to receive a wheel of a vehicle and a second side configured to receive an axle of the vehicle, the axle of the vehicle defining a longitudinal axis extending from the second side of the wheel end assembly; and
   a spindle extending longitudinally to define a longitudinal axis from a first end of the spindle to a second end of the spindle, the first end of the spindle configured to receive the wheel of the vehicle on the first side of the wheel end assembly, the second end of the spindle configured to receive the axle of the vehicle on the second side of the wheel end assembly,
   the second end of the spindle defining a flange configured to enable a plurality of mounting members to be received therethrough and defining a socket joint configured to receive the axle of the vehicle on the second side of the wheel end assembly, the flange defining a wheel side on a side interfacing the wheel end assembly corresponding to the first side of the wheel end assembly and an axle side on a side interfacing the axle of the vehicle corresponding to the second side of the wheel end assembly,
   the mounting members configured to extend distally from the axle side of the flange and along the longitudinal axis of the axle of the vehicle to extreme ends of the mounting members that are in positions extending away from the axle side of the flange to define a first distance from the axle side of the flange to the extreme ends of the mounting members that are in positions extended away from the axle side of the flange, the mounting members configured to secure the spindle to the wheel end assembly through the flange,
   the socket joint of the spindle extending from the second side of the wheel end assembly and along the longitudinal axis of the axle of the vehicle, the socket joint defining a cylindrical section concentrically defining a central aperture, the cylindrical section overlapping an external surface of the axle of the vehicle when an end of the axle is received within the central aperture of the socket joint,
   wherein an extreme end of the cylindrical section concentrically defines the central aperture to overlap the external surface of the axle of the vehicle when the end of the axle is received within the socket joint to define a second distance from the axle side of the flange to the extreme end of the cylindrical section, wherein the second distance is greater than the first distance to enable the spindle to be welded to the axle of the vehicle when the mounting members have been received through the flange of the spindle to secure the spindle to the wheel assembly.

5. The combination spindle and wheel end assembly according to claim 4, wherein the socket joint of the spindle defines a central aperture extending at least to an internal surface of the socket joint and wherein the axle of the vehicle defines the end received within the socket joint and extending into the central aperture at least to the internal surface of the socket joint to define a third distance extending from the extreme end of the cylindrical section to the internal surface that interfaces with the end of the axle establishing degree of overlap of the socket joint over the axle.

6. The combination spindle and wheel end assembly according to claim 5, wherein the axle of the vehicle defines an outer diameter and wherein the third distance establishing degree of overlap defines a ratio with respect to the outer diameter that ranges from 8% to 20%.

7. A spindle for a wheel end assembly, the wheel end assembly being configured to define a first side to receive a wheel of a vehicle and a second side configured to receive an axle of the vehicle, the axle of the vehicle defining an external surface and an end, the spindle comprising:
 a first end configured to receive the wheel of the vehicle on the first side of the wheel end assembly,
 a second end defining a flange integrated with a load-supporting member, the flange integrated with the load-supporting member further including a load-supporting drop arm extension member that projects downwardly from the load-supporting member to define a socket joint that includes a central aperture that is configured and disposed to receive the axle of the vehicle therein,
 the spindle and load-supporting member and load-supporting drop arm extension member defining thereby a spindle and drop arm integrated with a brake flange assembly, wherein the load-supporting drop arm extension member forms a bulk cylindrical section of the socket joint to concentrically define the central aperture, the bulk cylindrical section overlapping the external surface of the axle when the end of the axle is received within the socket joint, wherein the bulk cylindrical section of the socket joint defines a centerline axis that coincides with a longitudinal axis of the axle of the vehicle to define a first distance by which the bulk cylindrical section overlaps the external surface of the axle when the end of the axle is received within the socket joint to enable a fillet weld to be formed between the bulk cylindrical section and the external surface of the axle.

8. The spindle according to claim 7, wherein the end of the axle extends into the central aperture of the socket joint to define a distance establishing the degree of overlap of the socket joint over the axle.

9. The spindle according to claim 8, wherein the axle defines an outer diameter and the distance establishing the degree of overlap of the socket joint over the axle defines a ratio with respect to the outer diameter of the axle that ranges from 8% to 20%.

10. The spindle according to claim 8, wherein the load-supporting drop arm extension member extends downwardly and outwardly away from the axle side of the wheel end assembly to form an angle such that an internal surface of the bulk cylindrical section defines a second distance by which the internal surface extends away from the axle side of the wheel end assembly.

11. A method of assembling a spindle to a wheel end assembly comprising:
 providing a wheel end assembly configured to define a first side to receive a wheel of the vehicle and a second side configured to receive an axle of the vehicle;
 providing a spindle extending longitudinally to define a longitudinal axis from a first end of the spindle to a second end of the spindle, the first end of the spindle configured to receive the wheel of the vehicle on the first side of the wheel end assembly, the second end of the spindle configured to receive the axle of the vehicle on the second side of the wheel end assembly, the axle of the vehicle defining a longitudinal axis extending from the second side of the wheel end assembly; and
 configuring the second end of the spindle to define a flange configured to enable a plurality of mounting members to be received therethrough and defining a socket joint configured to receive the axle of the vehicle on the second side of the wheel end assembly, the flange defining a wheel side on a side interfacing the wheel end assembly corresponding to the first side of the wheel end assembly and an axle side on a side interfacing the axle of the vehicle corresponding to the second side of the wheel end assembly, the mounting members configured to extend distally from the axle side of the flange and along the longitudinal axis of the axle of the vehicle to extreme ends of the mounting members that are in positions extending away from the axle side of the flange to define a first distance from the axle side of the flange to the extreme ends of the mounting members that are in positions extended away from the axle side of the flange, the mounting members configured to secure the spindle to the wheel end assembly through the flange, the socket joint of the spindle extending from the second side of the wheel end assembly and along a longitudinal axis of the axle of the vehicle, the socket joint defining a cylindrical section concentrically defining a central aperture, the cylindrical section overlapping an external surface of the axle of the vehicle when an end of the axle is received within the central aperture of the socket joint, wherein an extreme end of the cylindrical section concentrically defines the central aperture to overlap the external surface of the axle of the vehicle when the end of the axle is received within the socket joint to define a second distance from the axle side of the flange to the extreme end of the cylindrical section, to define a second distance from the second side of the wheel assembly,
 mounting the spindle to the second side of the wheel end assembly by inserting the mounting members into the flange of the spindle, wherein the second distance is greater than the first distance,
 machining a journal inside a central aperture of the socket joint to create a pilot surface for the axle, and
 inserting the axle of the vehicle into the central aperture of the socket joint to interface with the pilot surface of the socket joint to form a corner for a fillet weld between a surface of the socket joint and an external surface of the axle of the vehicle.

12. The method of assembling a spindle for a wheel end assembly according to claim 11, wherein the external surface of the axle defines an outer diameter and the inserting the axle of the vehicle into the central aperture of the socket joint to interface with the pilot surface of the socket joint to form the corner for the fillet weld between the surface of the socket joint and the external surface of the axle of the vehicle includes inserting the axle of the vehicle into the central aperture a distance defining a ratio between the distance the axle of the vehicle has been inserted into the central aperture and the outer diameter defined by the external surface of the axle that ranges from 8% to 20%.

13. The method of assembling a spindle for a wheel end assembly according to claim 11, further comprising: welding the surface of the socket joint to the external surface of the axle of the vehicle to form the fillet weld while the spindle is mounted to the wheel end assembly.

14. A method of manufacturing a spindle for a wheel end assembly comprising:

provided a spindle extending longitudinally to define a longitudinal axis from a first end of the spindle to a second end of the spindle;

configuring the first end of the spindle to receive a wheel of a vehicle on a first side of a wheel end assembly that is configured to receive the wheel of a vehicle on the first side of the wheel end assembly and is configured to receive an axle of a vehicle on a second side of the wheel end assembly;

configuring the second end of the spindle to define a flange integrated with a load-supporting member;

configuring the flange integrated with the load-supporting member to further include a load-supporting drop arm extension member that projects downwardly from the load-supporting member to define a socket joint that includes a central aperture that is configured and disposed to receive the axle of a vehicle therein, such that the spindle and load-supporting member and load-supporting drop arm extension member defines thereby a spindle and drop arm integrated with a brake flange assembly, wherein the axle of the vehicle defines an external surface and an end, configuring the load-supporting drop arm extension member to form a bulk cylindrical section of the socket joint to concentrically define the central aperture, such that the bulk cylindrical section overlaps the external surface of the axle when the end of the axle is received within the socket joint, and configuring the bulk cylindrical section of the socket joint to define a centerline axis that coincides with a longitudinal axis of the axle of the vehicle to define a distance by which the bulk cylindrical section overlaps the external surface of the axle when the end of the axle is received within the socket joint to enable a fillet weld to be formed between the bulk cylindrical section and the external surface of the axle.

15. The method of manufacturing according to claim 14, further comprising: wherein the external surface of the axle defines an outer diameter and wherein configuring the end to extend into the central aperture of the socket joint to define the distance establishing the degree of overlap of the socket joint over the axle includes configuring the end to extend into the central aperture such that the distance by which the bulk cylindrical section overlaps the external surface of the axle defines a ratio with respect to the outer diameter of the axle that ranges from 8% to 20%.

16. The method of manufacturing according to claim 15, further comprising: configuring the load-supporting drop arm extension member to extend downwardly and outwardly away from the axle side of the wheel end assembly to form an angle such that an internal surface of the bulk cylindrical section defines a second distance by which the internal surface extends away from the axle side of the wheel end assembly.

* * * * *